United States Patent
Abad et al.

(10) Patent No.: US 11,993,288 B2
(45) Date of Patent: May 28, 2024

(54) AUTOMATED CUT-IN IDENTIFICATION AND CLASSIFICATION

(71) Applicant: Waymo LLC, Mountain View, CA (US)

(72) Inventors: Pablo Abad, Mountain View, CA (US); Aman Ved Kalia, Mountain View, CA (US); Juan Gomez-Ramos, Mountain View, CA (US); Jiayi Chen, Mountain View, CA (US); Jasman Singh Malik, Mountain View, CA (US); Joe Riggs, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 147 days.

(21) Appl. No.: 17/565,232

(22) Filed: Dec. 29, 2021

(65) Prior Publication Data

US 2023/0202530 A1    Jun. 29, 2023

(51) Int. Cl.
*B60W 60/00* (2020.01)
*B60W 50/00* (2006.01)
*G05B 13/02* (2006.01)

(52) U.S. Cl.
CPC .... *B60W 60/0027* (2020.02); *B60W 50/0098* (2013.01); *G05B 13/0265* (2013.01); *B60W 2050/0031* (2013.01); *B60W 2520/10* (2013.01); *B60W 2520/12* (2013.01); *B60W 2554/4042* (2020.02); *B60W 2554/4043* (2020.02); *B60W 2554/4045* (2020.02); *B60W 2554/4046* (2020.02); *B60W 2554/801* (2020.02);

(Continued)

(58) Field of Classification Search
None
See application file for complete search history.

(56) References Cited

U.S. PATENT DOCUMENTS

| 8,280,601 B2 | 10/2012 | Huang et al. |
| 8,457,827 B1 | 6/2013 | Ferguson et al. |

(Continued)

OTHER PUBLICATIONS

Jinwei Zhang, Interaction-Aware Cut-in Behavior Prediction and Risk Assessment for Autonomous Driving (2020) (Year: 2020).*

(Continued)

*Primary Examiner* — Christian Chace
*Assistant Examiner* — Shayne M. Gilbertson
(74) *Attorney, Agent, or Firm* — McDonnell Boehnen Hulbert & Berghoff LLP

(57) ABSTRACT

Example embodiments relate to a method for cut-in identification and classification. An example embodiment includes a obtaining operational data about one or more vehicles; based on the operational data, identifying the presence of one or more cut-ins within the operational data; extracting, from the operational data, cut-in data that depicts one or more of the cut-ins identified within the operational data; and, based on the extracted cut-in data, training a model for controlling an autonomous vehicle. Identifying the presence of a given cut-in includes: determining that at least one vertex of a bounding box surrounding a vehicle was located more than a threshold distance within a lane being navigated by a given vehicle; and determining that the ability of the given vehicle to maintain its course and speed was impeded by the presence of the particular additional vehicle within the lane.

20 Claims, 12 Drawing Sheets

(52) U.S. Cl.
CPC ... *B60W 2554/802* (2020.02); *B60W 2710/18* (2013.01); *B60W 2720/10* (2013.01); *B60W 2720/12* (2013.01)

(56) References Cited

U.S. PATENT DOCUMENTS

| | | | |
|---|---|---|---|
| 8,903,588 B2 | 12/2014 | Schmudderich et al. | |
| 10,209,712 B2 | 2/2019 | Stein | |
| 10,818,184 B2* | 10/2020 | Han | G08G 1/161 |
| 10,915,109 B2 | 2/2021 | Telpaz et al. | |
| 11,004,000 B1 | 5/2021 | Gutmann et al. | |
| 2019/0308620 A1* | 10/2019 | Sapp | G01S 13/86 |
| 2019/0384292 A1* | 12/2019 | Aragon | B60W 40/09 |
| 2020/0273342 A1* | 8/2020 | Kompalli | G06V 10/48 |
| 2021/0001897 A1 | 1/2021 | Chai et al. | |
| 2021/0009140 A1* | 1/2021 | Brooks | G06F 3/011 |
| 2021/0132619 A1 | 5/2021 | Refaat et al. | |
| 2021/0269065 A1 | 9/2021 | Haggblade et al. | |
| 2021/0295171 A1 | 9/2021 | Kamenev et al. | |
| 2021/0312177 A1 | 10/2021 | Bansal et al. | |
| 2021/0319287 A1 | 10/2021 | Refaat et al. | |
| 2021/0380099 A1* | 12/2021 | Lee | G08G 1/04 |

OTHER PUBLICATIONS

Remmen et al., "Cut-in Scenario Prediction for Automated Vehicles", IEEE International Conference on Vehicular Electronics and Safety, Sep. 12-14, 2018, 7 pages.

Hu et al., "Decision Tree-Based Maneuver Prediction for Driver Rear-End Risk-Avoidance Behaviors in Cut-In Scenarios", Journal of Advanced Transportation, vol. 2017, Article ID 7170358, 13 pages.

Ahmed et al., "Statistical modelling of critical cut-ins for the evaluation of autonomous vehicles and advanced driver assistance systems", Master's Thesis in Automotive Engineering, Chalmers University of Technology, 2020.

"Interaction-Aware Cut-in Behavior Prediction and Risk Assessment for Autonomous Driving"; Jinwei Zhang, et al.; IFAC-PAPERSONLINE—16th IFAC Symposium on Control in Transportation Systems CTS 2021 Lille, France, Jun. 8-10, 2021; vol. 53, No. 5 (Jan. 1, 2020).

"Naturalistic Driving Behavior Analysis under Typical Normal Cut-In Scenarios"; Xuehan Ma, et al.; SAE 2010 Commercial Vehicle Engineering Congress SAE Technical Papers; vol. 1 (Apr. 2, 2019).

"Driver Behavior Classification under Cut-In Scenarios Using Support Vector Machine Based on Naturalistic Driving Data"; Xuehan Ma, et al.; SAE 2010 Commercial Vehicle Engineering Congress SAE Technical Papers; vol. 1 (Apr. 2, 2019).

"Predicting Cut-Ins in Traffic Using a Neural Network Master's thesis in Systems, Control and Mechatronics"; Tonja Heinemann; XP055603765; Gothenburg, Sweden; retrieved from URL: https://pdfs.semanticscholar.org/be17/0747667db2db224ccbe3f909ad99de14c78a.pdf on Jul. 9, 2019 (Jan. 1, 2017).

* cited by examiner

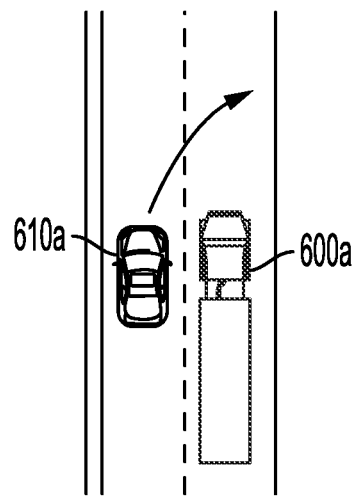
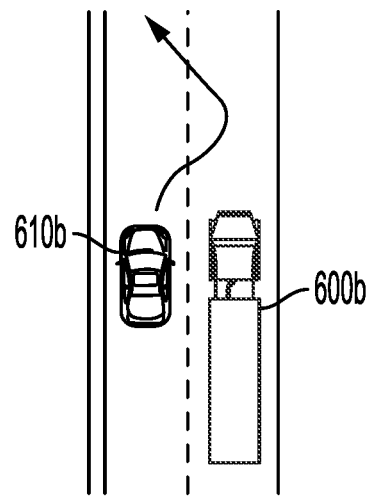
FIG. 6A          FIG. 6B
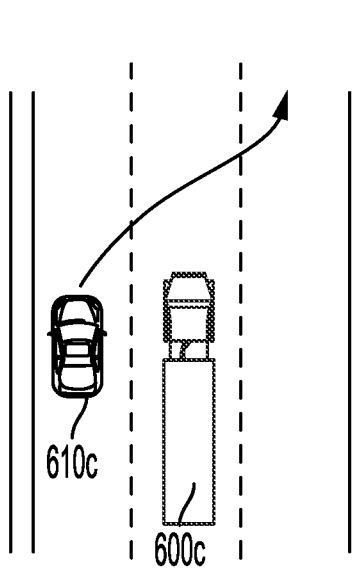
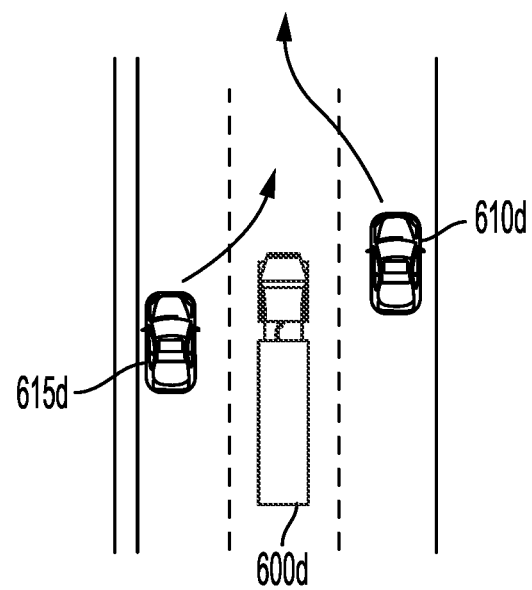
FIG. 6C          FIG. 6D

700

OBTAIN OPERATIONAL DATA ABOUT ONE OR MORE VEHICLES, WHEREIN THE OPERATIONAL DATA ABOUT A GIVEN VEHICLE OF THE ONE OR MORE VEHICLES COMPRISES INFORMATION ABOUT THE SIZE AND LOCATION OVER TIME OF ONE OR MORE ADDITIONAL VEHICLES IN THE ENVIRONMENT OF THE GIVEN VEHICLE, INFORMATION ABOUT THE LOCATION AND TRAJECTORY OF THE GIVEN VEHICLE OVER TIME, AND INFORMATION ABOUT THE EXTENT OF A LANE BEING NAVIGATED BY THE GIVEN VEHICLE OVER TIME

702

BASED ON THE OPERATIONAL DATA, IDENTIFY THE PRESENCE OF ONE OR MORE CUT-INS WITHIN THE OPERATIONAL DATA, WHEREIN IDENTIFYING THE PRESENCE OF A GIVEN CUT-IN COMPRISES: (I) DETERMINING THE LOCATION AND EXTENT OVER TIME OF A BOUNDING BOX SURROUNDING A PARTICULAR ADDITIONAL VEHICLE IN THE ENVIRONMENT OF THE GIVEN VEHICLE, (II) DETERMINING THAT AT LEAST ONE VERTEX OF THE BOUNDING BOX WAS LOCATED MORE THAN A THRESHOLD DISTANCE WITHIN THE LANE BEING NAVIGATED BY THE GIVEN VEHICLE, AND (III) DETERMINING THAT THE ABILITY OF THE GIVEN VEHICLE TO MAINTAIN ITS COURSE AND SPEED WAS IMPEDED BY THE PRESENCE OF THE PARTICULAR ADDITIONAL VEHICLE WITHIN THE LANE BEING NAVIGATED BY THE GIVEN VEHICLE WHEN THE AT LEAST ONE VERTEX OF THE BOUNDING BOX WAS LOCATED MORE THAN A THRESHOLD DISTANCE WITHIN THE LANE BEING NAVIGATED BY THE GIVEN VEHICLE

704

EXTRACT, FROM THE OPERATIONAL DATA, CUT-IN DATA THAT DEPICTS ONE OR MORE OF THE CUT-INS IDENTIFIED WITHIN THE OPERATIONAL DATA

706

BASED ON THE EXTRACTED CUT-IN DATA, TRAIN A MODEL FOR CONTROLLING AN AUTONOMOUS VEHICLE

```
┌─────────────────────────────────────────────────────────────────┐
│ OBTAIN OPERATIONAL DATA FOR A VEHICLE UNDER AUTONOMOUS OR SEMI- │
│   AUTONOMOUS CONTROL, WHEREIN THE OPERATIONAL DATA COMPRISES    │
│  INFORMATION ABOUT THE SIZE AND LOCATION OVER TIME OF ONE OR    │
│  MORE ADDITIONAL VEHICLES IN THE ENVIRONMENT OF THE VEHICLE AND │
│  INFORMATION ABOUT THE EXTENT OF A LANE BEING NAVIGATED BY THE  │
│                        VEHICLE OVER TIME                        │
└─────────────────────────────────────────────────────────────────┘
                                  │
                                  ▼                         802
┌─────────────────────────────────────────────────────────────────┐
│                                                                 │
│     APPLY THE OPERATIONAL DATA TO A TRAINED MODEL TO GENERATE A │
│                          CONTROL OUTPUT                         │
│                                                                 │
└─────────────────────────────────────────────────────────────────┘
                                  │                         804
                                  ▼
┌─────────────────────────────────────────────────────────────────┐
│   IMPLEMENT THE GENERATED CONTROL OUTPUT TO OPERATE THE VEHICLE │
│           UNDER AUTONOMOUS OR SEMI-AUTONOMOUS CONTROL           │
└─────────────────────────────────────────────────────────────────┘
                                                            806
```

OBTAIN OPERATIONAL DATA FOR A GIVEN VEHICLE, WHEREIN THE OPERATIONAL COMPRISES INFORMATION ABOUT THE SIZE AND LOCATION OVER TIME OF ONE OR MORE ADDITIONAL VEHICLES IN THE ENVIRONMENT OF THE GIVEN VEHICLE AND INFORMATION ABOUT THE EXTENT OF A LANE BEING NAVIGATED BY THE GIVEN VEHICLE OVER TIME

902

BASED ON THE OPERATIONAL DATA, DETECT THAT A CUT-IN IS OCCURRING

AUTOMATED CUT-IN IDENTIFICATION AND CLASSIFICATION

BACKGROUND

Unless otherwise indicated herein, the description in this section is not prior art to the claims in this application and is not admitted to be prior art by inclusion in this section.

A controller for controlling an autonomous vehicle can be generated or improved based on training data depicting the real or simulated operation of a vehicle in a target environment (e.g., driving on a highway). Such training data can include sensor data (e.g., lidar data, GPS data, radar data, vehicle status data), commands to the vehicle (generated by an autonomous controller and/or by a human driver), or other data related to the operation of a vehicle (e.g., an autonomous vehicle) in a target environment and/or performing target behaviors.

SUMMARY

In a first aspect, a method is provided that includes: (i) obtaining operational data about one or more vehicles, wherein the operational data about a given vehicle of the one or more vehicles includes information about the size and location over time of one or more additional vehicles in the environment of the given vehicle, information about the location and trajectory of the given vehicle over time, and information about the extent of a lane being navigated by the given vehicle over time; (ii) based on the operational data, identifying the presence of one or more cut-ins within the operational data, wherein identifying the presence of a given cut-in comprises: (a) determining the location and extent over time of a bounding box surrounding a particular additional vehicle in the environment of the given vehicle, (b) determining that the particular additional vehicle entered the lane being navigated by the given vehicle by at least one of determining that at least one vertex of the bounding box was located more than a threshold distance within the lane being navigated by the given vehicle or determining that the bounding box overlapped with the lane being navigated by the given vehicle by more than a threshold amount, and (c) determining that the ability of the given vehicle to maintain its course and speed was impeded by the particular additional vehicle entering the lane being navigated by the given vehicle; (iii) extracting, from the operational data, cut-in data that depicts one or more of the cut-ins identified within the operational data; and (iv) based on the extracted cut-in data, training a model for controlling an autonomous vehicle.

In a second aspect, a method is provided that includes: (i) obtaining operational data for a vehicle under autonomous or semi-autonomous control, wherein the operational data comprises information about the size and location over time of one or more additional vehicles in the environment of the vehicle and information about the extent of a lane being navigated by the vehicle over time; (ii) applying the operational data to a trained model to generate a control output, wherein the trained model has been trained by (a) obtaining operational data about one or more vehicles, wherein the operational data about a given vehicle of the one or more vehicles includes information about the size and location over time of one or more additional vehicles in the environment of the given vehicle, information about the location and trajectory of the given vehicle over time, and information about the extent of a lane being navigated by the given vehicle over time; (b) based on the operational data, identifying the presence of one or more cut-ins within the operational data, wherein identifying the presence of a given cut-in comprises: (1) determining the location and extent over time of a bounding box surrounding a particular additional vehicle in the environment of the given vehicle, (2) determining that the particular additional vehicle entered the lane being navigated by the given vehicle by at least one of determining that at least one vertex of the bounding box was located more than a threshold distance within the lane being navigated by the given vehicle or determining that the bounding box overlapped with the lane being navigated by the given vehicle by more than a threshold amount, and (3) determining that the ability of the given vehicle to maintain its course and speed was impeded by the particular additional vehicle entering the lane being navigated by the given vehicle; (c) extracting, from the operational data, cut-in data that depicts one or more of the cut-ins identified within the operational data; and (d) based on the extracted cut-in data, training the trained model to control an autonomous or semi-autonomous vehicle; and (iii) implementing the generated control output to operate the vehicle under autonomous or semi-autonomous control.

In a third aspect, a method for cut-in detection is provided that includes: (i) obtaining operational data for a given vehicle, wherein the operational comprises information about the size and location over time of one or more additional vehicles in the environment of the given vehicle and information about the extent of a lane being navigated by the given vehicle over time; and (ii) based on the operational data, detecting that a cut-in is occurring, wherein detecting that a cut-in is occurring comprises: (a) determining the location and extent over time of a bounding box surrounding a particular additional vehicle in the environment of the given vehicle, and (b) determining that the particular additional vehicle entered the lane being navigated by the given vehicle by at least one of determining that at least one vertex of the bounding box was located more than a threshold distance within the lane being navigated by the given vehicle or determining that the bounding box overlapped with the lane being navigated by the given vehicle by more than a threshold amount. The method of the third aspect can include additional steps or features. For example, the given vehicle could be operating in an autonomous or semi-autonomous mode and the method of the third aspect could additionally include operating the given vehicle to react to the detected cut-in, e.g., by accelerating, decelerating, braking, steering, honking, or taking some other action to avoid impacting the particular additional vehicle and/or to avoid some other unwanted consequence. Additionally or alternatively, the given vehicle could be operating in a semi-autonomous or non-autonomous mode with a human driver and the method of the third aspect could additionally include providing an indication to the human driver to alert the human driver as to the detected cut-in and/or properties thereof (e.g., where the detected cut-in is occurring, a type of the detected cut-in), thereby allowing the human driver to react to the detected cut-in.

In a fourth aspect, a non-transitory computer readable medium is provided having stored thereon instructions that, when executed by one or more processors of a computing device, cause the computing device to perform operations to implement the method of any of the first, second, or third aspects.

In a fifth aspect, a system is provided that includes: (i) one or more processing units; and (ii) a non-transitory computer-readable medium. The non-transitory computer-readable medium has stored thereon at least computer-executable instructions that, when executed by the one or more processing units, cause the computing device to perform operations to implement the method of any of the first, second, or third aspects.

These as well as other aspects, advantages, and alternatives will become apparent to those of ordinary skill in the art by reading the following detailed description, with reference, where appropriate, to the accompanying drawings.

BRIEF DESCRIPTION OF THE DRAWINGS

FIG. 6A is an illustration of vehicles navigating an environment, according to an example embodiment.

FIG. 6B is an illustration of vehicles navigating an environment, according to an example embodiment.

FIG. 6C is an illustration of vehicles navigating an environment, according to an example embodiment.

FIG. 6D is an illustration of vehicles navigating an environment, according to an example embodiment.

FIG. 7 is a flowchart of a method, according to example embodiments.

FIG. 8 is a flowchart of a method, according to example embodiments.

FIG. 9 is a flowchart of a method, according to example embodiments.

DETAILED DESCRIPTION

Figure 1:
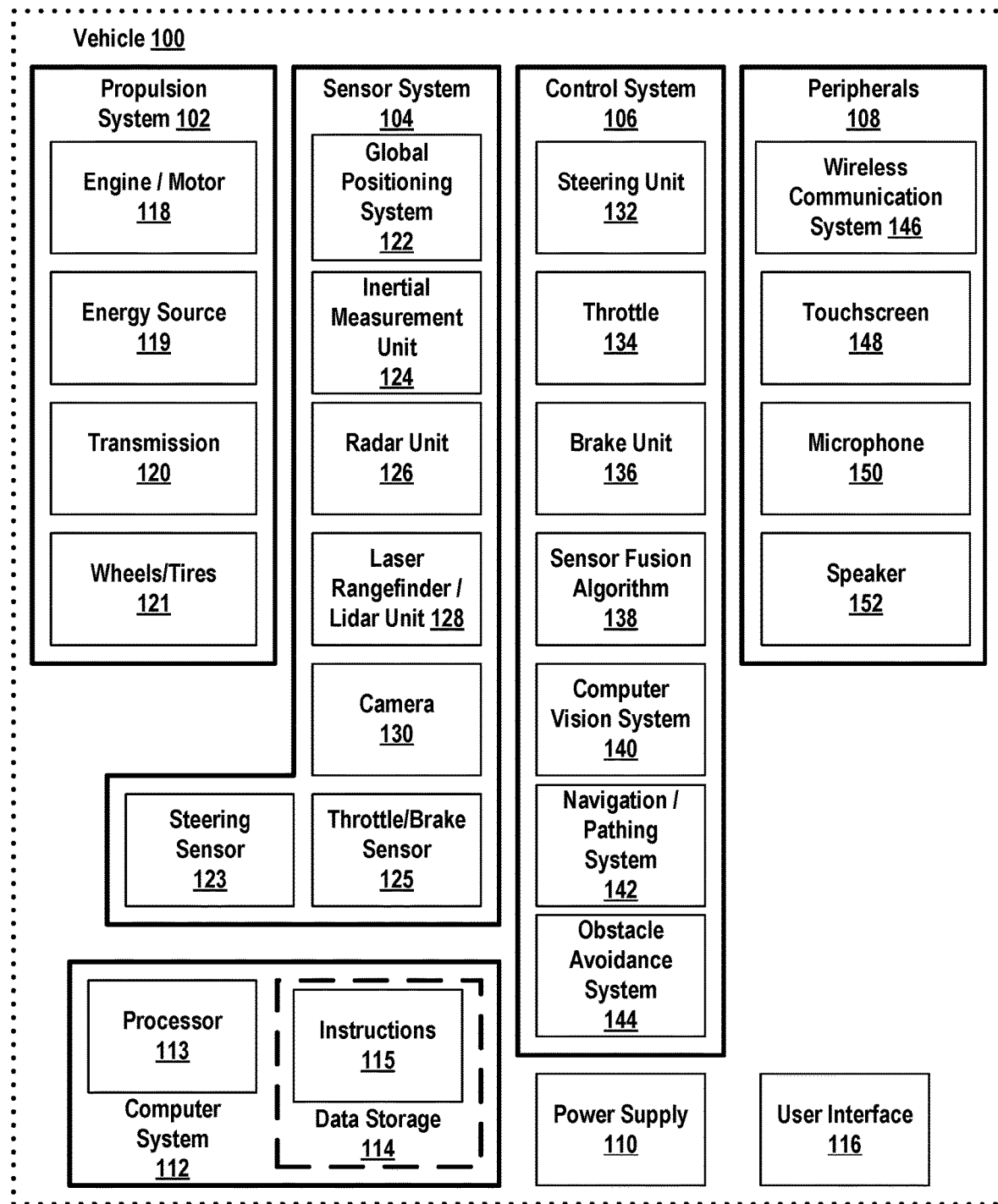
FIG. 1 is a functional block diagram illustrating a vehicle, according to example embodiments.
Figure 2A:
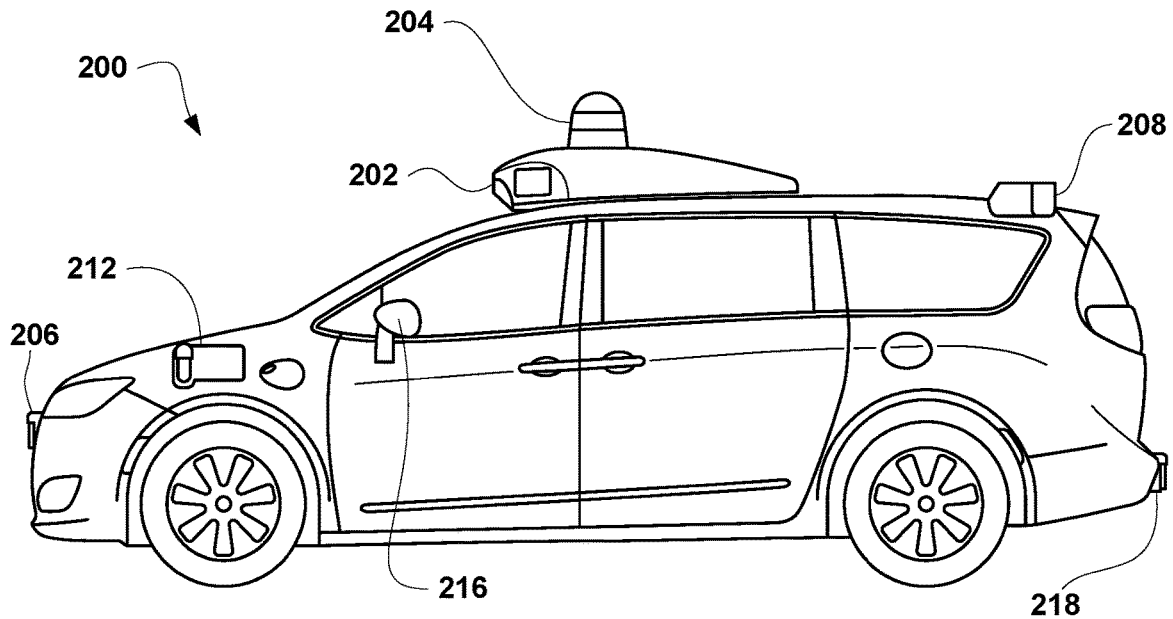
FIG. 2A is an illustration of a physical configuration of a vehicle, according to example embodiments.
Figure 2B:
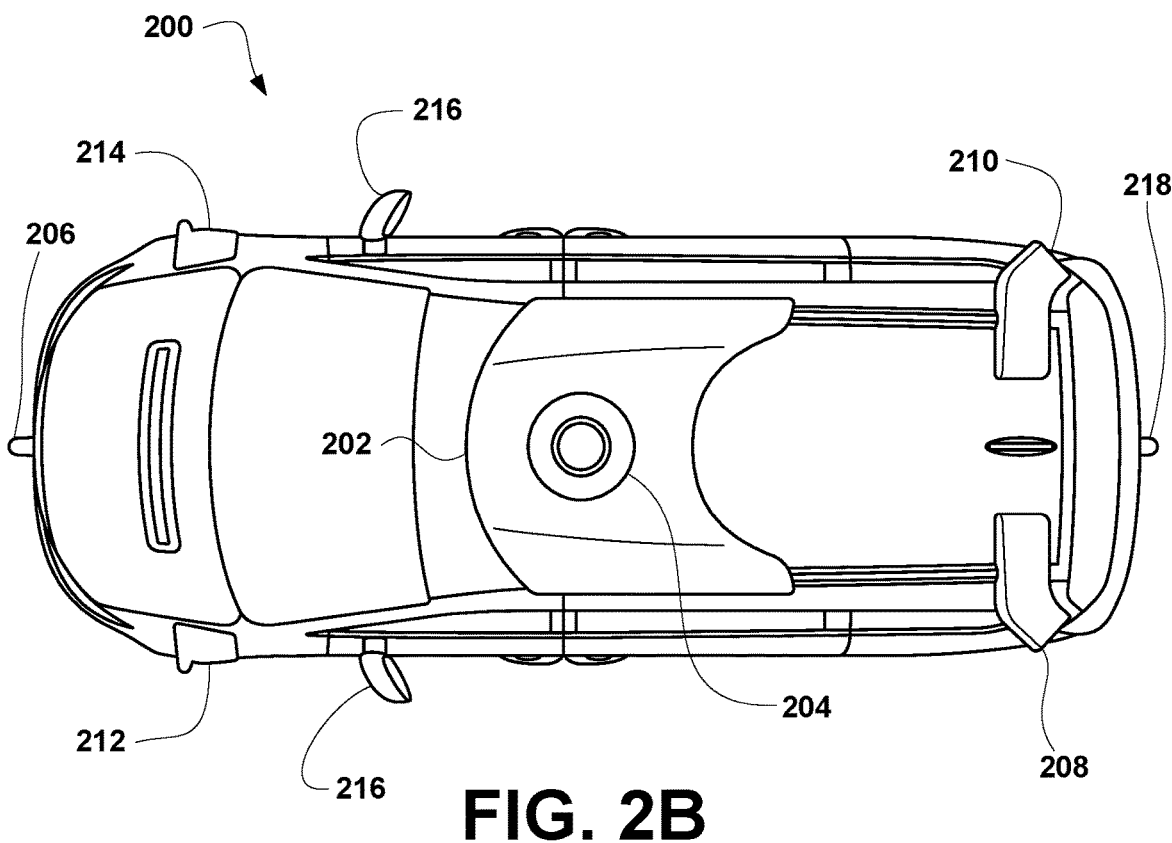
FIG. 2B is an illustration of a physical configuration of a vehicle, according to example embodiments.
Figure 2C:
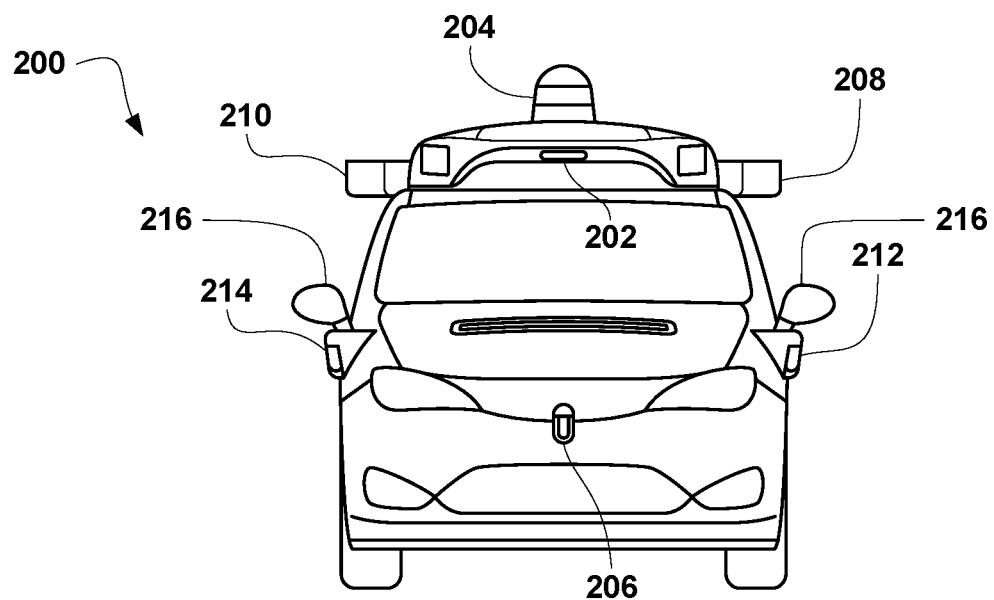
FIG. 2C is an illustration of a physical configuration of a vehicle, according to example embodiments.
Figure 2D:
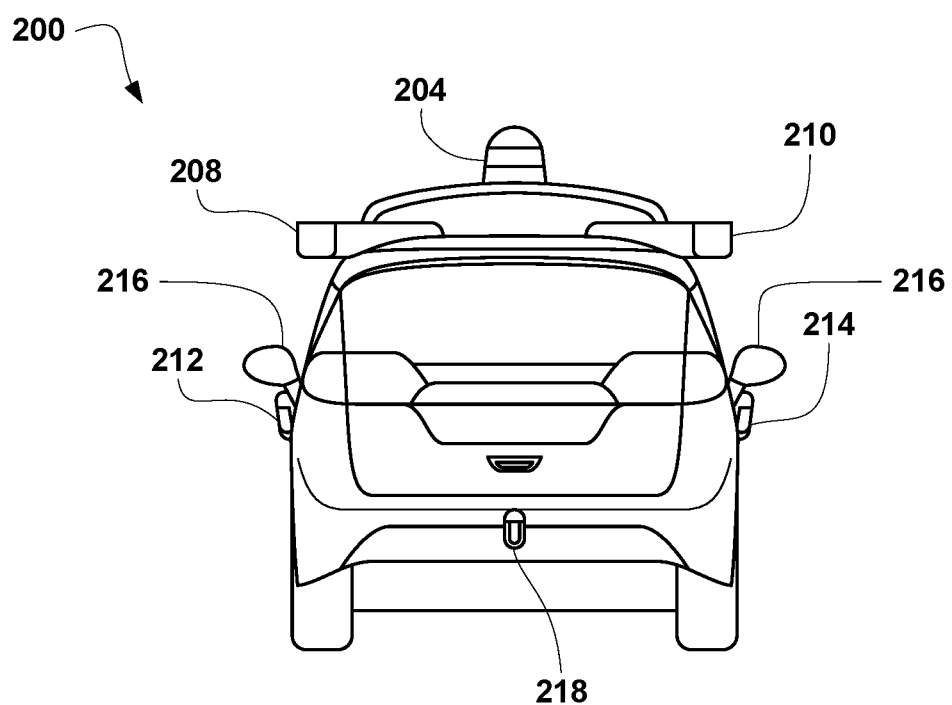
FIG. 2D is an illustration of a physical configuration of a vehicle, according to example embodiments.
Figure 2E:
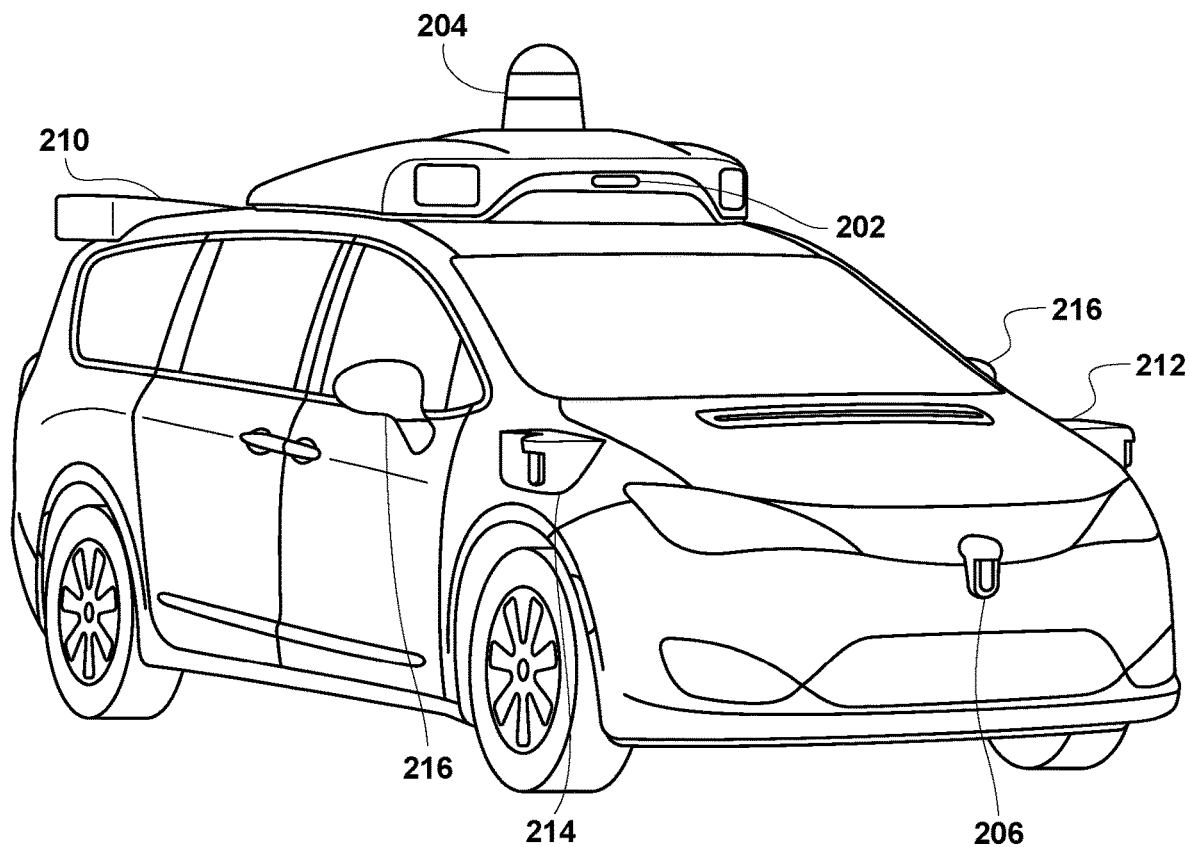
FIG. 2E is an illustration of a physical configuration of a vehicle, according to example embodiments.

Training data depicting the real or simulated operation of a vehicle in a target environment (e.g., a semi-trailer truck hauling a trailer, a passenger automobile, or some other vehicle driving on a highway or in some other environment) can be used to train or otherwise generate a model for controlling an autonomous vehicle. A very large amount of such training data is often available. However, it can be difficult to apply such data to the generation, updating, improvement, and/or training of a model for controlling an autonomous or semi-autonomous vehicle. This can be due in part to the computational cost of analyzing the entirety of such a training dataset. This difficulty can also be related to much of the training data representing "easy" driving conditions, e.g., steady driving on clear roads without interference from other vehicles. It can be desirable to emphasize training data that depicts more "difficult" circumstances, as these circumstances are often the most difficult to adequately address by a model for controlling an autonomous or semi-autonomous vehicle.

One particular variety of such "difficult" driving conditions or events is the occurrence of a "cut-in." A cut-in is an event wherein another vehicle (a "cut-in agent") enters the lane ahead of (or behind) a target vehicle, interfering with the target vehicle's ability to maintain its course and speed. A cut-in differs from a "merge" event, in which another vehicle enters the lane ahead of (or behind) a target vehicle, in that such a merge event does not interfere with the target vehicle's ability to maintain its course and speed and/or in that the lanes occupied by the target vehicle and other vehicle, respectively, merge together into a single lane. This difference may be due to (1) the merging vehicle's speed, relative location, and trajectory being such that it does not interfere with a target vehicle's pre-existing course and speed, (2) the target vehicle accurately predicted that the other vehicle was about to change lanes and proactively adjusted its course and/or speed, such that the other vehicle's eventual merger does not interfere with the target vehicle's proactively adjusted course and speed, and/or (3) the merging vehicle entering the target vehicle's lane outside of a designated area for merging (e.g., the end of a lane, an on ramp, etc.).

As noted above, it can be desirable to extract and/or label such cut-ins within a training dataset in order to emphasize the data related to such events in the training of model(s) for controlling autonomous or semi-autonomous vehicles, to train model(s) for detecting the occurrence or likelihood of future occurrence of cut-ins for autonomous, semi-autonomous, or non-autonomous vehicles, to assess the efficacy and safety of such trained models in reacting to such events, and/or to target the efforts of human researchers in tuning the structure and/or training of such models. Such events can be manually labeled; however, manual labeling is costly, time-intensive, and often inaccurate. Instead, the automated cut-in detection methods described herein can be used to quickly, accurately, and cost-effectively identify cut-ins within autonomous vehicle training data. The identification of the cut-ins can then be used to improve the training of autonomous or semi-autonomous vehicle control models, e.g., by extracting portions of the training data proximate in time to the identified cut-in events and using that data to generate, train, and/or improve the models for controlling autonomous or semi-autonomous vehicles, to assess the safety and/or efficacy of such models, or to provide some other benefit. Such extracted data can also be used to classify the cut-ins.

Automated detection of cut-ins can include, based on available training data, determining bounding boxes that define the size, shape, location, bearing, and/or trajectory of other vehicles in a target vehicle's environment over time (such other vehicles may be referred to as "agents," and when they perform a cut-in, as "cut-in agents"). The available training data can also be used to determine the location and trajectory of the given vehicle over time and information about the extent of a lane being navigated by the given vehicle over time. Such information about the extent of a lane being navigated by the given vehicle over time can include curves and/or surfaces defining the boundaries of the lane in space. Identification of cut-ins can then include determining that at least one vertex of the bounding box of an agent was located more than a threshold distance within the lane being navigated by the given vehicle (e.g., within a curve and/or surface defining a boundary of the lane in space) and/or the bounding box or the agent overlaps with the lane being navigated by the given vehicle by more than a threshold amount (e.g., by more than 10% of the area of the bounding box). A cut-in can be identified when an agent engages in such an entering of the target vehicle's lane in this manner. In some examples, additional criteria could be evaluated for such potential cut-ins in order to complete the identification. For example, a cut-in could be identified when an agent enters the target vehicle's lane in the manner described above and such entry impeded the ability of the target vehicle to maintain its course and speed.

The training data associated with a cut-in can be pre-processed to generate information about the cut-in and/or about a target vehicle's response to the cut-in. Such pre-processing can include determining how much the target vehicle slowed down because of the cut-in agent (e.g., target vehicle deceleration (m/s2), target vehicle speed reduction (m/s)), determining how hard the target vehicle braked because of the cut-in agent (target vehicle deceleration (m/s2), target vehicle jerk (m/s3)), determining when the target vehicle first acted to react to the cut-in agent (e.g., the time of the first reaction relative to the timing of the cut-in agent's bounding box entering the target vehicle's lane by more than the threshold distance), determining how close the target vehicle got to the cut-in agent (e.g., time to collision(s) with the cut-in agent, time gap(s), time to overlap with cut-in agent's location(s) at the time of the beginning of the cut-in), and/or how long the target vehicle followed the cut-in agent at a following distance lower than a safe following distance. Such pre-processing could additionally or alternatively include determining metrics for agents near the target vehicle, e.g., for agents in adjacent lanes, agents tailing the target vehicle, etc. Such nearby-agent metrics can include acceleration, deceleration, jerk, swerves, or other behaviors induced in such nearby agents by the target vehicle's behavior as indicators of how well the target vehicle responded to an identified cut-in event.

Such information or other information of and/or determined from the training data associated with the cut-in(s) could be used to score the reaction of an autonomous vehicle controller to each cut-in; such a score could be used to update, select, combine, train, or otherwise improve an automated vehicle controller. Such information and/or other information from the training data could also be used to classify the cut-ins, e.g., as a nominal cut-in of a slower vehicle, a nominal cut-in of a faster vehicle, an aborted cut-in, a cut-through, or a zipper cut-in. Such cut-in classifications could then be used to train and/or grade models for controlling an autonomous or semi-autonomous vehicle or to provide some other benefit.

Cut-in detection methods as are described herein (e.g., that include determining that a bounding box vertex/area has overlapped with a lane by more than a threshold distance/area/amount) could additionally or alternatively be used heuristically to detect cut-ins in real-time for a vehicle that is operating in an autonomous, semi-autonomous, and/or non-autonomous mode. For example, an autonomously operating vehicle could use the cut-in detection methods described herein to detect that a cut-in is occurring (e.g., by detecting the location over time of another vehicle, determining the location over time of vertices of a bounding box containing the other vehicle, and then determining that at least one of the vertices has entered into the autonomous vehicle's lane by more than a threshold distance and/or that the bounding box overlaps with the autonomous vehicle's lane by more than a threshold area). The autonomous vehicle could then take action in response to the detected cut-in, e.g., to reduce speed, turn, honk a horn, etc. Where the vehicle is being operated by a human driver (e.g., in a semi-autonomous or non-autonomous manner), a cut-in detected in this manner could be indicated to the human driver, e.g., via a light, display, sound, or other indication that the human driver could perceive such that the human driver can become aware that a cut-in is occurring, where the cut-in is occurring, the type of cut-in that is occurring, etc.

Additionally or alternatively, cut-ins detected, within a training data set, using the methods described herein could be used to train a model to predict the likelihood of cut-ins occurring in the future. Such a predictive model could then be used to predict cut-ins before they occur and to take action and/or provide an indication of the predicted future cut-in. Where the vehicle is operating in an autonomous or semi-autonomous mode, this could include an autonomous vehicle controller taking actions (steering, throttle, etc. and/or changing a future trajectory or plan) based on the predicted cut-in. Where the vehicle is operating in a semi-autonomous or non-autonomous mode with a human driver, taking responsive action could include indicating to the human driver, e.g., via a light, display, sound, or other indication that the human driver could perceive regarding that a cut-in is occurring or is likely to occur, where the cut-in is likely to occur, the type of cut-in likely to occur, etc. such that the human driver can take ameliorative action (e.g., decelerate, steer, honk, etc.)

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. Additionally, an example system may also be implemented in or take the form of various vehicles, such as cars, trucks, motorcycles, buses, airplanes, helicopters, drones, lawn mowers, earth movers, boats, submarines, all-terrain vehicles, snowmobiles, aircraft, recreational vehicles, amusement park vehicles, farm equipment or vehicles, construction equipment or vehicles, warehouse equipment or vehicles, factory equipment or vehicles, trams, golf carts, trains, trolleys, sidewalk delivery vehicles, robot devices, etc. Other vehicles are possible as well.

Lidar devices as described herein can include one or more light emitters and one or more detectors used for detecting light that is emitted by the one or more light emitters and reflected by one or more objects in an environment surrounding the lidar device. As an example, the surrounding environment could include an interior or exterior environment, such as an inside of a building or an outside of a building. Additionally or alternatively, the surrounding environment could include an interior of a vehicle. Still further, the surrounding environment could include a vicinity around and/or on a roadway. Examples of objects in the surrounding environment include, but are not limited to, other vehicles, traffic signs, pedestrians, roadway surfaces, buildings, terrain, etc. Additionally, the one or more light emitters could emit light into a local environment of the lidar system itself. For example, light emitted from the one or more light emitters could interact with a housing of the lidar system and/or surfaces or structures coupled to the lidar system. And in some cases, the lidar system could be mounted to a vehicle, in which case the one or more light emitters could be configured to emit light that interacts with objects within a vicinity of the vehicle. Further, the light emitters could include optical fiber amplifiers, laser diodes, light-emitting diodes (LEDs), among other possibilities.

Further, in some embodiments, example systems might not include a vehicle. For example, a system as described herein could include one or more servers, standalone computers, datacenters, cloud computing systems, or other computational systems/services that could be used to generate a model for controlling an autonomous or semi-autonomous vehicle and/or a an algorithm or other aspect of such a model. Such a system could be configured, as described elsewhere herein, to use information about the operation of autonomous, semi-autonomous, and/or human-controlled vehicle(s) in order to generate a model or other algorithm for controlling an autonomous or semi-autonomous vehicle. Such a system could operate to generate such a model once, e.g., to use such training data and/or other information to generate a model that is then copied to or otherwise implemented on one or more autonomous or semi-autonomous vehicles. Additionally or alternatively, such a system could operate over time to generate multiple such models and/or updates thereto. For example, a system could, over time, receive additional sensor data, operational feedback, or other training data from one or more vehicles operating in the world or from some other data source (e.g., simulated operation of vehicles in a wholly or partially simulated environment) and use that additional information to generate improved models (e.g., versions of previous model(s) updated in view of the additional information). Additionally or alternatively, improved training methods and/or model architectures or algorithms could be applied to pre-existing training data to generate improved models. These improved models could then be transmitted wirelessly or via some other communications means to one or more autonomous or semi-autonomous vehicles to improve the operation of such vehicles.

Such models for controlling an autonomous or semi-autonomous vehicle could include artificial neural networks, physics-based models, heuristically-designed algorithms/software (e.g., having one or more trainable parameters), or other elements and/or combinations of elements for analyzing input data and for generating outputs (e.g., vehicle control outputs, display outputs) therefrom. Such models could include aspects that could pre-process sensor data (e.g., to filter a lidar point cloud, to identify vehicles or other objects therefrom), generate and/or update a map of an environment from sensor data (e.g., to generate an updated map of an environment while also accurately and precisely locating an autonomous vehicle within that environment), predict the future location and behavior of other vehicles, determine high-level goals for a vehicle (e.g., determine high-level target trajectories through an environment, set maximum and minimum speed, acceleration, and/or braking values for a vehicle based on prevailing conditions, determine when a vehicle should modify its route to accommodate recharging, refueling, or other considerations), generate low-level vehicle control outputs (e.g., sub-second resolution throttle, brake, steering, or other controls), generate displays or other indications (e.g., warning indications or driving guidance to a human inside the vehicle, turn signals to humans and/or systems outside the vehicle, wireless transmissions informing other traffic of a vehicle's intended path), or perform some other computational task related to the operation of an autonomous or semi-autonomous vehicle.

Such models could be executed on a single processor or system or distributed across a number of processors/systems of a vehicle (e.g., aspects for processing lidar data could be executed by one or more processors located within a lidar subsystem, while aspects for determining vehicle trajectories and generating vehicle control outputs could be executed by one or more processors located in a central processing module of a vehicle).

Such models could include artificial neural networks, convolutional neural networks, deep neural networks, decision trees, regression trees, support vector machines, or other trained machine learning models or combinations thereof. Additionally or alternatively, such models could include human-written or otherwise manually-tailored algorithms. Such manually-tailored algorithms could include parameters (e.g., thresholds, delay periods) whose values could be set, as part of a training process, based on training data as described herein.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. Additionally, example vehicle 100 may operate in a partially autonomous (i.e., semi-autonomous) mode in which some functions of the vehicle 100 are controlled by a human driver of the vehicle 100 and some functions of the vehicle 100 are controlled by the computing system. For example, vehicle 100 may also include subsystems that enable the driver to control operations of vehicle 100 such as steering, acceleration, and braking, while the computing system performs assistive functions such as lane-departure warnings/lane-keeping assist or adaptive cruise control based on other objects (e.g., vehicles) in the surrounding environment.

As shown in FIG. 1, vehicle 100 may include various subsystems, such as propulsion system 102, sensor system 104, control system 106, one or more peripherals 108, power supply 110, computer system 112 (could also be referred to as a computing system), data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, laser rangefinder/lidar 128, camera 130, steering sensor 123, and throttle/brake sensor 125, among other possible sensors. In some embodiments, sensor system 104 may also include sensors configured to monitor internal systems of the vehicle 100 (e.g., 02 monitor, fuel gauge, engine oil temperature, brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the local environment of vehicle 100. As such, radar 126 may include antennas configured to transmit and receive radio signals. In some embodiments, radar 126 may correspond to a mountable radar system configured to obtain measurements of the surrounding environment of vehicle 100.

Laser rangefinder/lidar 128 may include one or more laser sources, a laser scanner, and one or more detectors, among other system components, and may operate in a coherent mode (e.g., using heterodyne detection) or in an incoherent detection mode (i.e., time-of-flight mode). In some embodiments, the one or more detectors of the laser rangefinder/lidar 128 may include one or more photodetectors. Such photodetectors may be especially sensitive detectors. In some examples, such photodetectors may be capable of detecting single photons (e.g., SPADs). Further, such photodetectors can be arranged (e.g., through an electrical connection in series) into an array (e.g., as in a SiPM). In some examples, the one or more photodetectors are Geiger-mode operated devices and the lidar includes subcomponents designed for such Geiger-mode operation.

Camera 130 may include one or more devices (e.g., still camera, video camera, a thermal imaging camera, a stereo camera, a night vision camera, etc.) configured to capture images of the surrounding environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., traffic lights, roadway boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

The operation of some or all of the modules of the control system 106, sensor system 104, or other systems of the vehicle 100 could include executing or otherwise implementing all or part of a model for controlling the vehicle 100 that has been trained as described elsewhere herein. For example, the methods described herein to train a model could be used to generate some or all of the algorithms or other computational processes of the sensor fusion algorithm 138, computer vision system 140, navigation/pathing system 142, obstacle avoidance system 144, or other elements of the vehicle 100.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion. In some examples, the computer system 112 could operate to implement some or all of a model for controlling the vehicle 100.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108. Data storage 114 may contain information describing a model for controlling the operation of the vehicle 100, e.g., neural network connection weights and connectivity diagrams, decision tree thresholds, features, and connectivity diagrams, instructions to implement a manually-tailored algorithm, or some other information to facilitate the processor 113 or some other computational device of the vehicle 100 to implement all or a portion of a model for controlling the vehicle 100 as described herein.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of a surrounding environment of vehicle 100 operating in an autonomous mode. The state of the surrounding environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 and/or laser rangefinder/lidar 128, and/or some other environmental mapping, ranging, and/or positioning sensor system may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E shows an example vehicle 200 (e.g., a fully autonomous vehicle or semi-autonomous vehicle) that can include some or all of the functions described in connection with vehicle 100 in reference to FIG. 1. Although vehicle 200 is illustrated in FIGS. 2A-2E as a van with side view mirrors 216 for illustrative purposes, the present disclosure is not so limited. For instance, the vehicle 200 can represent a truck, a car, a semi-trailer truck, a motorcycle, a golf cart, an off-road vehicle, a farm vehicle, or any other vehicle that is described elsewhere herein (e.g., buses, boats, airplanes, helicopters, drones, lawn mowers, earth movers, submarines, all-terrain vehicles, snowmobiles, aircraft, recreational vehicles, amusement park vehicles, farm equipment, construction equipment or vehicles, warehouse equipment or vehicles, factory equipment or vehicles, trams, trains, trolleys, sidewalk delivery vehicles, and robot devices, etc.).

The example vehicle 200 may include one or more sensor systems 202, 204, 206, 208, 210, 212, 214, and 218. In some embodiments, sensor systems 202, 204, 206, 208, 210, 212, 214, and/or 218 could represent one or more optical systems (e.g. cameras, etc.), one or more lidars, one or more radars, one or more range finders, one or more inertial sensors, one or more humidity sensors, one or more acoustic sensors (e.g., microphones, sonar devices, etc.), or one or more other sensors configured to sense information about an environment surrounding the vehicle 200. In other words, any sensor system described elsewhere herein could be coupled to the vehicle 200 and/or could be utilized in conjunction with various operations of the vehicle 200. As an example, a lidar system could be utilized in self-driving or other types of navigation, planning, perception, and/or mapping operations of the vehicle 200. In addition, sensor systems 202, 204, 206, 208, 210, 212, 214, and/or 218 could represent a combination of sensors described herein (e.g., one or more lidars and radars, one or more lidars and cameras, one or more cameras and radars, etc.).

In some examples, the sensor systems could be disposed in various other locations on the vehicle 200 (e.g., at location 216, etc.) and could have fields of view that correspond to internal and/or surrounding environments of the vehicle 200. While the one or more sensor systems 202, 204, 206, 208, 210, 212, 214, and/or 218 are illustrated on certain locations on vehicle 200, it will be understood that more or fewer sensor systems could be utilized with vehicle 200. Further, the locations of such sensor systems could be adjusted, modified, or otherwise changed as compared to the locations of the sensor systems illustrated in FIGS. 2A-2E.

The one or more sensor systems 202, 204, 206, 208, 210, 212, 214, and/or 218 could include one or more lidar sensors. For example, the lidar sensors could include a plurality of light-emitter devices arranged over a range of angles with respect to a given plane (e.g., the x-y plane). For example, one or more of the sensor systems 202, 204, 206, 208, 210, 212, 214, and/or 218 may be configured to rotate or pivot about an axis (e.g., the z-axis) perpendicular to the given plane so as to illuminate an environment surrounding the vehicle 200 with light pulses. Based on detecting various aspects of reflected light pulses (e.g., the elapsed time of flight, polarization, intensity, etc.), information about the surrounding environment may be determined.

In an example embodiment, sensor systems 202, 204, 206, 208, 210, 212, 214, and/or 218 may be configured to provide respective point cloud information that may relate to physical objects within the surrounding environment of the vehicle 200. While vehicle 200 and sensor systems 202, 204, 206, 208, 210, 212, 214, and 218 are illustrated as including certain features, it will be understood that other types of sensor systems are contemplated within the scope of the present disclosure. Further, the example vehicle 200 can include any of the components described in connection with vehicle 100 of FIG. 1.

Note that the number, location, and type of sensor systems (e.g., 202, 204, etc.) depicted in FIGS. 2A-E are intended as a non-limiting example of the location, number, and type of such sensor systems of an autonomous or semi-autonomous vehicle. Alternative numbers, locations, types, and configurations of such sensors are possible (e.g., to comport with vehicle size, shape, aerodynamics, fuel economy, aesthetics, or other conditions, to reduce cost, to adapt to specialized environmental or application circumstances, etc.).

The sensor system 202 may be mounted atop the vehicle 200 and may include one or more sensors configured to detect information about an environment surrounding the vehicle 200, and output indications of the information. For example, sensor system 202 can include any combination of cameras, radars, lidars, range finders, inertial sensors, humidity sensors, and acoustic sensors (e.g., microphones, sonar devices, etc.). The sensor system 202 can include one or more movable mounts that could be operable to adjust the orientation of one or more sensors in the sensor system 202. In one embodiment, the movable mount could include a rotating platform that could scan sensors so as to obtain information from each direction around the vehicle 200. In another embodiment, the movable mount of the sensor system 202 could be movable in a scanning fashion within a particular range of angles and/or azimuths and/or elevations. The sensor system 202 could be mounted atop the roof of a car, although other mounting locations are possible.

Additionally, the sensors of sensor system 202 could be distributed in different locations and need not be collocated in a single location. Furthermore, each sensor of sensor system 202 can be configured to be moved or scanned independently of other sensors of sensor system 202. Additionally or alternatively, multiple sensors may be mounted at one or more of the sensor locations 202, 204, 206, 208, 210, 212, 214, and/or 218. For example, there may be two lidar devices mounted at a sensor location and/or there may be one lidar device and one radar mounted at a sensor location.

In an example configuration, one or more radars can be located on vehicle 200. For example, one or more sensor systems 202, 204, 206, 208, 210, 212, 214, and/or 218 could include one or more radars. In some examples, one or more radars can be located near the rear of the vehicle 200 (e.g., sensor systems 208, 210, etc.), to actively scan the environment near the back of the vehicle 200 for the presence of radio-reflective objects. Similarly, one or more radars can be located near the front of the vehicle 200 (e.g., sensor systems 212, 214, etc.) to actively scan the environment near the front of the vehicle 200. A radar can be situated, for example, in a location suitable to illuminate a region including a forward-moving path of the vehicle 200 without occlusion by other features of the vehicle 200. For example, a radar can be embedded in and/or mounted in or near the front bumper, front headlights, cowl, and/or hood, etc. Furthermore, one or more additional radars can be located to actively scan the side and/or rear of the vehicle 200 for the presence of radio-reflective objects, such as by including such devices in or near the rear bumper, side panels, rocker panels, and/or undercarriage, etc.

The vehicle 200 can include one or more cameras. For example, the one or more sensor systems 202, 204, 206, 208, 210, 212, 214, and/or 218 could include one or more cameras. The camera can be a photosensitive instrument, such as a still camera, a video camera, a thermal imaging camera, a stereo camera, a night vision camera, etc., that is configured to capture a plurality of images of the surrounding environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the surrounding environment. To this end, the camera may use one or more range detecting techniques. For example, the camera can provide range information by using a structured light technique in which the vehicle 200 illuminates an object in the surrounding environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

Although not shown in FIGS. 2A-2E, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
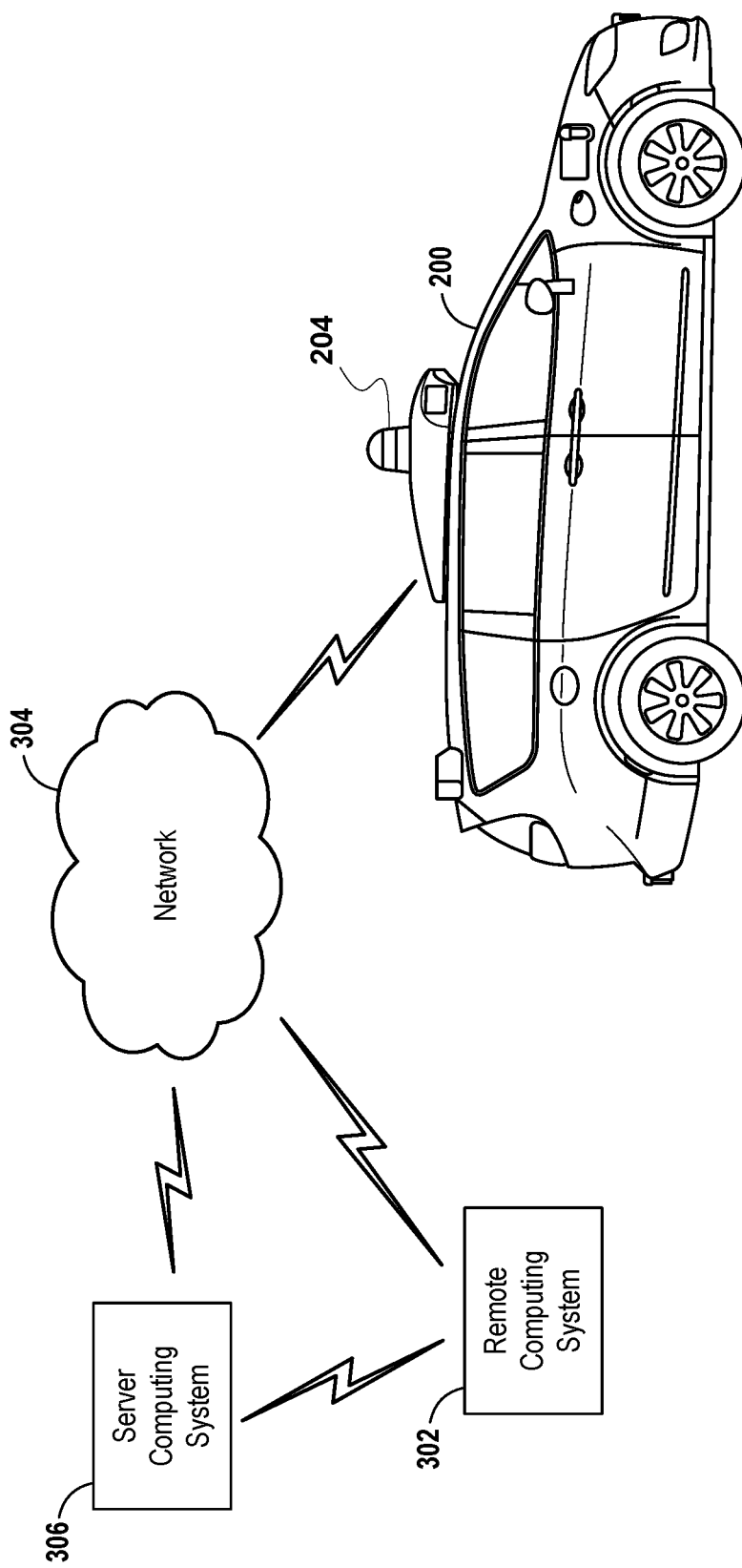
FIG. 3 is a conceptual illustration of wireless communication between various computing systems related to an autonomous vehicle, according to example embodiments.

FIG. 3 is a conceptual illustration of wireless communication between various computing systems related to an autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous mode that enables a control system to safely navigate vehicle 200 between destinations using sensor measurements. When operating in an autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, or a computing system local to vehicle 200) may operate to use a camera to capture images of the surrounding environment of an autonomous vehicle. In general, at least one computing system will be able to analyze the images and possibly control the autonomous vehicle.

In some embodiments, to facilitate autonomous operation a vehicle (e.g., vehicle 200) may receive data representing objects in an environment surrounding the vehicle (also referred to herein as "environment data") in a variety of ways. A sensor system on the vehicle may provide the environment data representing objects of the surrounding environment. For example, the vehicle may have various sensors, including a camera, a radar unit, a laser range finder, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar unit may be configured to transmit an electromagnetic signal that will be reflected by various objects near the vehicle, and then capture electromagnetic signals that reflect off the objects. The captured reflected electromagnetic signals may enable the radar system (or processing system) to make various determinations about objects that reflected the electromagnetic signal. For example, the distances to and positions of various reflecting objects may be determined. In some embodiments, the vehicle may have more than one radar in different orientations. The radar system may be configured to store captured information to a memory for later processing by a processing system of the vehicle. The information captured by the radar system may be environment data.

In another example, a laser range finder may be configured to transmit an electromagnetic signal (e.g., infrared light, such as that from a gas or diode laser, or other possible light source) that will be reflected by target objects near the vehicle. The laser range finder may be able to capture the reflected electromagnetic (e.g., infrared light) signals. The captured reflected electromagnetic signals may enable the range-finding system (or processing system) to determine a range to various objects. The laser range finder may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the surrounding environment of the vehicle. For example, the processing system may combine data from both radar information and a captured image to determine if another vehicle or pedestrian is in front of the autonomous vehicle. In other embodiments, other combinations of sensor data may be used by the processing system to make determinations about the surrounding environment.

While operating in an autonomous mode (or semi-autonomous mode), the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the surrounding environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the surrounding environment to determine at least one object having a detection confidence below a threshold. A processor in the vehicle may be configured to detect various objects of the surrounding environment based on environment data from various sensors. For example, in one embodiment, the processor may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the surrounding environment, or is present in the surrounding environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the surrounding environment in various ways depending on the source of the environment data. In some embodiments, the environment data may come from a camera and be image or video data. In other embodiments, the environment data may come from a lidar unit. The vehicle may analyze the captured image or video data to identify objects in the image or video data. The methods and apparatuses may be configured to monitor image and/or video data for the presence of objects of the surrounding environment. In other embodiments, the environment data may be radar, audio, or other data. The vehicle may be configured to identify objects of the surrounding environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the surrounding environment, it may also calculate a confidence associated with the specific detected object. The confidence may be calculated in various ways depending on the embodiment. In one example, when detecting objects of the surrounding environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4A:
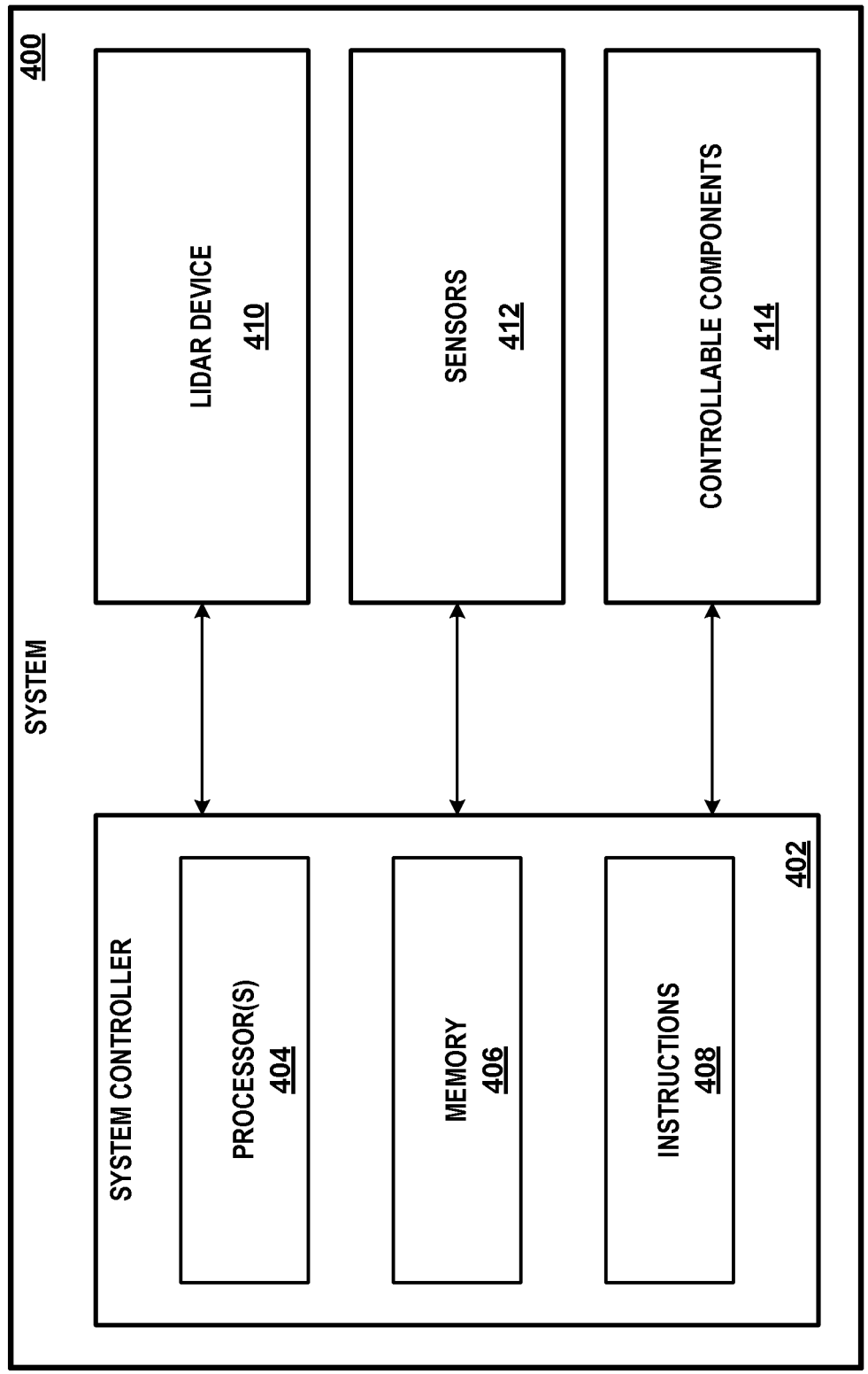
FIG. 4A is a block diagram of a system including a lidar device, according to example embodiments.

FIG. 4A is a block diagram of a system, according to example embodiments. In particular, FIG. 4A shows a system 400 that includes a system controller 402, a lidar device 410, a plurality of sensors 412, and a plurality of controllable components 414. System controller 402 includes processor(s) 404, a memory 406, and instructions 408 stored on the memory 406 and executable by the processor(s) 404 to perform functions.

The processor(s) 404 can include one or more processors, such as one or more general-purpose microprocessors and/or one or more special purpose microprocessors. The one or more processors may include, for instance, an application-specific integrated circuit (ASIC) or a field-programmable gate array (FPGA). Other types of processors, computers, or devices configured to carry out software instructions are contemplated herein.

The memory 406 may include a computer-readable medium, such as a non-transitory, computer-readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The lidar device 410 includes a plurality of light emitters configured to emit light (e.g., in light pulses) and one or more light detectors configured to detect light (e.g., reflected portions of the light pulses). The lidar device 410 may generate three-dimensional (3D) point cloud data from outputs of the light detector(s), and provide the 3D point cloud data to the system controller 402. The system controller 402, in turn, may perform operations on the 3D point cloud data to determine the characteristics of a surrounding environment (e.g., relative positions of objects within a surrounding environment, edge detection, object detection, proximity sensing, or the like). The performance of such operations could be specified by part of a model for controlling an autonomous or semi-autonomous vehicle that has been trained according to the methods described herein.

Similarly, the system controller 402 may use outputs from the plurality of sensors 412 to determine the characteristics of the system 400 and/or characteristics of the surrounding environment. For example, the sensors 412 may include one or more of a GPS, an Inertial Measurement Unit (IMU), an image capture device (e.g., a camera), a light sensor, a heat sensor, and other sensors indicative of parameters relevant to the system 400 and/or the surrounding environment. The lidar device 410 is depicted as separate from the sensors 412 for purposes of example, and may be considered as part of or as the sensors 412 in some examples.

Based on characteristics of the system 400 and/or the surrounding environment determined by the system controller 402 based on the outputs from the lidar device 410 and the sensors 412, the system controller 402 may control the controllable components 414 to perform one or more actions. For example, the system 400 may correspond to a vehicle, in which case the controllable components 414 may include a braking system, a turning system, and/or an accelerating system of the vehicle, and the system controller 402 may change aspects of these controllable components based on characteristics determined from the lidar device 410 and/or sensors 412 (e.g., when the system controller 402 controls the vehicle in an autonomous mode). Within examples, the lidar device 410 and the sensors 412 are also controllable by the system controller 402. Such actions could be performed based on an output of a model for controlling an autonomous or semi-autonomous vehicle that has been trained according to the methods described herein.

Figure 4B:
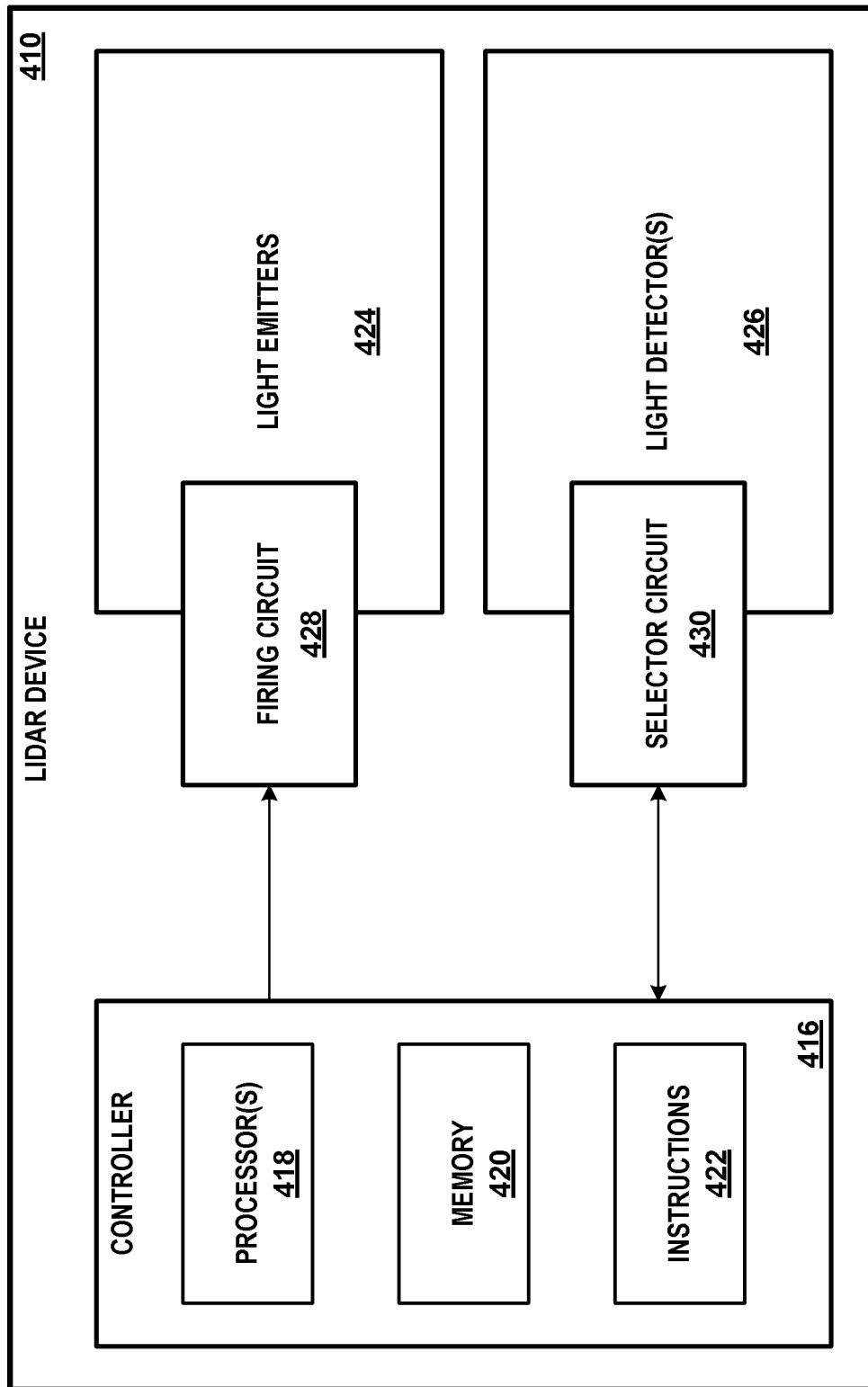
FIG. 4B is a block diagram of a lidar device, according to example embodiments.

FIG. 4B is a block diagram of a lidar device, according to an example embodiment. In particular, FIG. 4B shows a lidar device 410, having a controller 416 configured to control a plurality of light emitters 424 and one or more light detector(s), e.g., a plurality of light detectors 426. The lidar device 410 further includes a firing circuit 428 configured to select and provide power to respective light emitters of the plurality of light emitters 424 and may include a selector circuit 430 configured to select respective light detectors of the plurality of light detectors 426. The controller 416 includes processor(s) 418, a memory 420, and instructions 422 stored on the memory 420.

Similar to processor(s) 404, the processor(s) 418 can include one or more processors, such as one or more general-purpose microprocessors and/or one or more special purpose microprocessors. The one or more processors may include, for instance, an application-specific integrated circuit (ASIC) or a field-programmable gate array (FPGA). Other types of processors, computers, or devices configured to carry out software instructions are contemplated herein.

Similar to memory 406, the memory 420 may include a computer-readable medium, such as a non-transitory, computer-readable medium, such as, but not limited to, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The instructions 422 are stored on memory 420 and executable by the processor(s) 418 to perform functions related to controlling the firing circuit 428 and the selector circuit 430, for generating 3D point cloud data, and for processing the 3D point cloud data (or perhaps facilitating processing the 3D point cloud data by another computing device, such as the system controller 402).

The controller 416 can determine 3D point cloud data by using the light emitters 424 to emit pulses of light. A time of emission is established for each light emitter and a relative location at the time of emission is also tracked. Aspects of a surrounding environment of the lidar device 410, such as various objects, reflect the pulses of light. For example, when the lidar device 410 is in a surrounding environment that includes a road, such objects may include vehicles, signs, pedestrians, road surfaces, construction cones, or the like. Some objects may be more reflective than others, such that an intensity of reflected light may indicate a type of object that reflects the light pulses. Further, surfaces of objects may be at different positions relative to the lidar device 410, and thus take more or less time to reflect portions of light pulses back to the lidar device 410. Accordingly, the controller 416 may track a detection time at which a reflected light pulse is detected by a light detector and a relative position of the light detector at the detection time. By measuring time differences between emission times and detection times, the controller 416 can determine how far the light pulses travel prior to being received, and thus a relative distance of a corresponding object. By tracking relative positions at the emission times and detection times the controller 416 can determine an orientation of the light pulse and reflected light pulse relative to the lidar device 410, and thus a relative orientation of the object. By tracking intensities of received light pulses, the controller 416 can determine how reflective the object is. The 3D point cloud data determined based on this information may thus indicate relative positions of detected reflected light pulses (e.g., within a coordinate system, such as a Cartesian coordinate system) and intensities of each reflected light pulse. The firing circuit 428 is used for selecting light emitters for emitting light pulses. The selector circuit 430 similarly is used for sampling outputs from light detectors.

As noted above, models used to control the operation of an autonomous or semi-autonomous vehicle can be improved by using training data from real or simulated operation of vehicles navigating real or simulated environments. Such training data can include sensor data generated by lidars, cameras, radars, engine sensors, environment sensors, road sensors, or other sensors of one or more vehicles, information about control signals used to control the vehicle(s) (e.g., throttle, steering, brake, or other controls generated by a human driver, by a controller of an autonomous or semi-autonomous vehicle), ground truth information about the location of vehicles in an environment, or other information related to the operation and environment of one or more vehicles in a real or simulated environment.

However, the training data available to train, evaluate, select, or otherwise improve such models is often extensive, making training or other processes based on the training data computationally expensive or otherwise difficult. It can be beneficial to emphasize more "difficult" or "complex" situations or scenarios within the training data when training or assessing models used to control an autonomous or semi-autonomous vehicle. This can be related to the available training datasets representing mostly "simple" driving situations or scenarios, e.g., steady driving on well-maintained roadways with minimal road curvature and no or few vehicles or other obstacles on or near the roadway. Training data associated with such "simple" situations or scenarios provides minimal value in the training or assessment of models for controlling autonomous or semi-autonomous vehicles.

Emphasizing more "difficult" or "complex" situations or scenarios within the training data when training or assessing models used to control an autonomous or semi-autonomous vehicle can include weighting the data relating to such situations or scenarios more heavily or even extracting the data relating to such situations or scenarios from the wider set of training data and proceeding to train or assess the model(s) using only the extracted data. By doing so, the computational cost of training or assessing the model(s) can be reduced. Further, the quality of model(s) trained in such a manner can be improved, as the training of the model(s) will have emphasized the more "difficult" situations or scenarios, resulting in trained model(s) that are more capable of handling such "difficult" situations or scenarios.

Such "difficult" situations or scenarios could include a variety of situations or scenarios wherein navigation is particularly difficult for autonomous or semi-autonomous vehicle controllers and/or situations or scenarios wherein navigation is particularly difficult for any driver of a vehicle, human or artificial. For example, "difficult" situations or scenarios could include rain, snow, fog, sleet, extreme temperatures, icy roads, wet roads, or other weather conditions that result in less safe and/or more difficult driving. "Difficult" situations or scenarios could include environments that are particularly densely populated with other vehicles, pedestrians, or other objects to be avoided. "Difficult" situations or scenarios could include construction zones, roadways that do not comport with standard roadway or signage rules (e.g., obsolete or incomplete signage, non-standard signage, potholes or other poor roadway maintenance conditions, dirt or gravel roads, single-lane two-way roadways, narrow lanes or roadways, low turn radius turns, high inclines). "Difficult" situations or scenarios could include instances wherein one or more other vehicles "cut in" to the lane of a vehicle under autonomous or semi-autonomous control, thereby interfering with the ability of the controlled vehicle to maintain its course and/or speed. Such events may be referred to as "cut-ins," and the vehicles that are cutting in may be referred to as "cut-in agents."

Cut-ins can be identified manually within a set of training data. However, such manual identification can be expensive, time-consuming, incomplete, and/or inaccurate. Instead, the methods described herein could be applied to training data sets to quickly, cheaply, and accurately identify cut-ins within one or more training data sets. Data related to the cut-ins identified thusly could then be used to update, select, combine, update, train, generate, and/or improve model(s) for controlling an autonomous or semi-autonomous vehicle. This could include extracting, pre-processing, or otherwise using segments of the training data set that are proximate in time to the identified cut-ins and then using the extracted segments of the training data set to generate and/or improve model(s) for controlling an autonomous or semi-autonomous vehicle. Additionally or alternatively, such segments of the training data set could be used to assess such model(s), e.g., by generating metrics related to the ability of such model(s) to react to cut-ins.

The methods described herein for automated cut-in detection include 1) determining that another vehicle (or "agent") has entered the lane being traveled by a vehicle of interest (or "subject vehicle," the lane being traveled by the subject vehicle may be referred to as the "subject lane"), and 2) that the entry of the agent into the subject lane interfered with the ability of the subject vehicle to maintain its course and/or speed (thus the agent was a "cut-in agent").

A variety of methods could be used to efficiently determine, from a training data set, that another agent entered the subject lane of a subject vehicle. This could include determining, for each agent in the training data set, a set of vertices over time that define bounding boxes that contain the other agents. The extent of the subject lane for the subject vehicle over time could also be determined, and a potential cut-in event identified whenever any of the vertices for another agent is located more than a threshold distance (e.g., 0.1 meters) within the subject lane and/or whenever a bounding box for another agent overlaps by more than a threshold amount with the subject lane (e.g., more than 10% of the area of the bounding box).

Figure 5A:
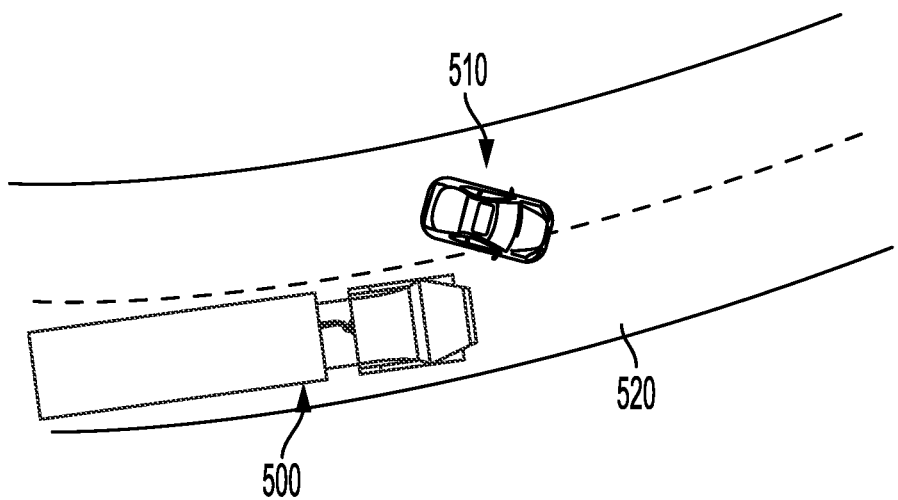
FIG. 5A is an illustration of vehicles navigating an environment, according to an example embodiment.
Figure 5B:
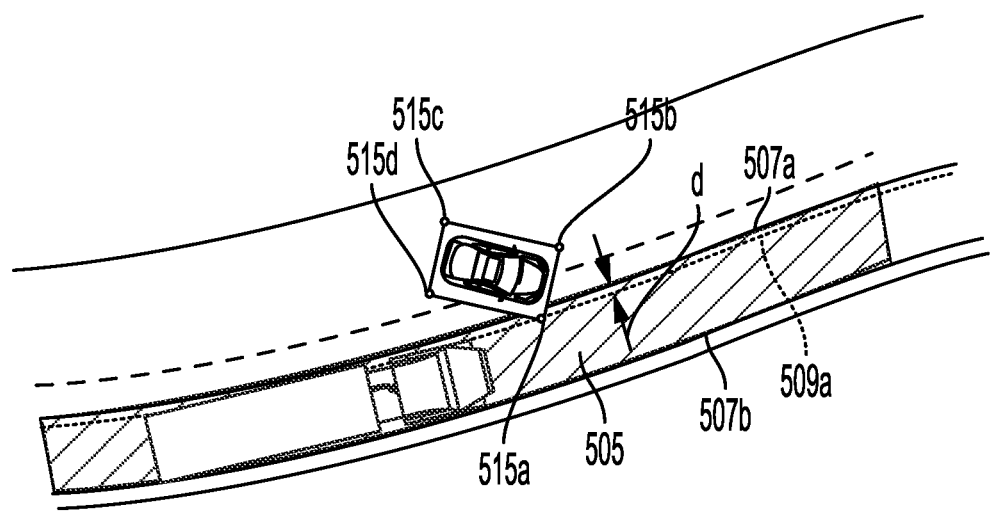
FIG. 5B is an illustration of an analysis of the vehicles and environment depicted in FIG. 5A, according to an example embodiment.

FIG. 5A illustrates, at a particular point in time, a subject vehicle 500 and another agent 510 navigating a roadway 520. FIG. 5B illustrates, by way of example, parts of an analysis of training data related to the scenario depicted in FIG. 5B. A bounding box, defined by four vertices 515a-d, has been determined for the agent 510. These vertices could be determined, e.g., from lidar point cloud data, radar data, camera data, or other data from sensors of the subject vehicle 500 and/or from data generated therefrom (e.g., from location, angle, size, shape, speed, yaw, or other data generated by one or more processors of the subject vehicle 500 based on lidar point clouds or other sensor data at the time that the subject vehicle 500 was involved in the scenario depicted in FIGS. 5A-B).

The extent of the subject lane 505 of the subject vehicle 500 has also been determined. The subject lane 505 is bounded by left 507a and right 507b curves/surfaces. The subject lane 505 could be determined from sensor data generated by the subject vehicle 500 and/or from data generated therefrom. In some examples, the extent of the subject lane 505 could be determined based on the intended and/or predicted trajectory of an autonomous or semi-autonomous controller of the subject vehicle 500 at the time that the subject vehicle 500 was involved in the scenario depicted in FIGS. 5A-B. Alternatively, the extent of the subject lane 505 could be determined after the fact (e.g., based on the extent of a marked lane on the roadway 520 that the subject vehicle 500 was occupying). The extent of the subject lane 505 could be restricted to the course of marked lanes on the roadway 520. In such examples, cut-ins and/or potential cut-ins detected while the subject vehicle 500 was changing lanes and/or from specified periods of time before/after such lane changes could be discarded. Alternatively, the extent of the subject lane 505 could be fully or partially unconstrained by such roadway demarcations. For example, the extent of the subject lane 505 could be determined solely by the predicted and/or intended course of the subject vehicle 500 at the time that the subject vehicle 500 was involved in the scenario depicted in FIGS. 5A-B.

As noted above, a vehicle (e.g., 510) entering the subject lane (e.g., 505), and thus potentially representing a cut-in, can be detected by detecting that at least one of the bounding box vertices for the vehicle has entered the subject lane by more than a threshold distance. FIG. 5B depicts this as distance "d," with the curve/surface that is the distance d within the subject lane 505 from the left bound 507a depicted by a dashed line 509a. Thus, at the point in time depicted in FIGS. 5A-B, agent 510 may be engaged in a cut-in because one of the agent's 510 bounding box vertices, 515a, has entered into the subject lane by more than the threshold distance d. The threshold distance d could be any distance appropriate to detect cut-ins with a desired specificity and/or sensitivity. For example, the distance d could be between 0.05 meters and 0.15 meters, e.g., 0.1 meters. The distance d could be specified based on the size of the subject vehicle 500 (e.g., a set fraction of the total width of the subject vehicle 500), the speed of the subject vehicle 500, prevailing environmental or road conditions, the width of the marked lanes on the roadway 520 (e.g., a set fraction of the width of the marked lanes), the width of the roadway 520 (e.g., a set fraction of the width of the roadway 520), or some other factor(s). The distance d could be adjusted based on the method used to determine the location and extent of the subject lane 505 (e.g., to account for different methods generating wider or narrower subject lanes).

Additionally or alternatively, a vehicle (e.g., 510) entering the subject lane (e.g., 505), and thus potentially representing a cut-in, can be detected by detecting that a bounding box for the vehicle has overlapped the lane by more than a threshold amount (e.g., by more than 10% of the area of the bounding box).

Once a potential cut-in has been identified as described above, such a potential cut-in can be identified as a cut-in by determining whether the potential cut-in agent's entering the subject vehicle's subject lane impeded the subject vehicle's ability to maintain its course and speed. This could be accomplished in a variety of ways.

In some examples, determining that an agent's entering the subject lane impeded the subject vehicle's ability to maintain its course and speed includes determining that the potential cut-in occurred less than a threshold distance in front of/behind the subject vehicle. Such a threshold distance could be determined based on the speed of the subject vehicle and/or the speed (e.g., the longitudinal speed parallel to the subject lane) of the cut-in agent.

In some examples, determining that an agent's entering the subject lane impeded the subject vehicle's ability to maintain its course and speed includes determining that the subject vehicle would have impacted/been impacted by the cut-in agent if the subject vehicle had continued on its course and speed prior to the cut-in. The course and speed used for this determination could be the course and speed of the subject vehicle at the moment the cut-in agent entered the subject lane (e.g., the moment a bounding box vertex of the cut-in agent entered the subject lane by more than the threshold distance) or the course and speed of the subject vehicle at some point(s) in time prior to the moment that the cut-in agent entered the subject lane (e.g., to account for changes in course and/or speed that a human, automated, or semi-automated driver of the subject vehicle might have made in anticipation of the cut-in).

In some examples, determining that an agent's entering the subject lane impeded the subject vehicle's ability to maintain its course and speed includes determining that a human, automated, or semi-automated driver of the subject vehicle engaged in a corrective action due to the cut-in agent entering the subject lane. This could include determining that the driver engaged in a supra-threshold braking, steering, throttle, or other command of the subject vehicle within a specified period of time before/after the cut-in agent entered the subject lane. Additionally or alternatively, this could be determined based on output logs generated by an automated or semi-automated driver, e.g., based on such logs indicating that the automated or semi-automated driver engaged in a maneuver and/or altered a planned course in response to the cut-in agent entering the subject lane. In some examples, this could include only identifying those instances where the automated or semi-automated driver took such actions less than a specified period of time prior to the cut-in agent entering the subject lane and/or where the automated or semi-automated driver did not accurately predict the cut-in (e.g., to detect as cut-ins only those lane changes that were not anticipated by the automated or semi-automated driver).

Note that, while FIGS. 5A-B and 6A-D depict cut-ins wherein a cut-in agent enters the subject lane of a subject vehicle in front of the subject vehicle, a cut-in as described herein can also include instances wherein a cut-in agent enters the subject lane behind the subject vehicle. For example, where a subject vehicle is merging into/out of traffic from/to an on/off-ramp, or has changed lanes, and must accelerate, steer, change lanes, or engage in some other behavior in order to mitigate a cut-in agent's having cut into the subject lane behind the subject vehicle.

Once one or more cut-ins have been identified within a set of training data, the cut-ins can be classified. This could be done to improve the training of models for controlling an autonomous or semi-autonomous vehicle. E.g., a first model could be trained to predict and/or identify the cut-ins and their classes, and then a number of different models of elements thereof (e.g., sub-models) could be trained to react to respective different classes or sets of classes of cut-ins. Classifying the cut-ins could be done based on sensor data directly, based on information determined therefrom, based on internal variables of a model controlling an autonomous or semi-autonomous vehicle, or some other data in a training dataset and/or variables determined therefrom. For example, cut-ins could be classified based on a degree to which a vehicle slowed down due to the cut-in, a degree to which a vehicle applied brakes due to the cut-in, a timing of an action taken by a vehicle in reaction to the cut-in relative to a timing at which the cut-in occurred, a minimum distance between a vehicle and a cut-in agent following a cut-in, and/or a duration of a period that a vehicle followed a cut-in agent at a distance less than a threshold safety distance following a cut-in.

Classifying cut-ins can include assigning the cut-ins to one or more classes. Such classes could be mutually exclusive, overlapping, or some combination of classes. The classes of cut-in could be related to the relative speed of the cut-in agent, the starting, destination, and/or intervening lanes occupied by the cut-in agent, the number of cut-in agents involved in the cut-in event, or some other factors.

An enumerated set of cut-in classes could include nominal cut-ins, wherein a cut-in agent leaves a starting lane and enters the subject lane of a subject vehicle. This is depicted in FIG. 6A, wherein a cut-in agent 610*a* is about to enter the subject lane in front of a subject vehicle 600*a* (the trajectory of the cut-in agent 610*a* is depicted by the arrow) from a starting lane other than the subject lane. Such nominal cut-ins could be divided into nominal cut-ins by slower vehicles and nominal cut-ins by faster vehicles. Nominal cut-ins could be further divided to represent cut-ins by vehicles at the same speed, or at speeds within a threshold range of speeds relative to a subject vehicle. Alternatively, such same-speed nominal cut-ins could be classified as a cut-in by a slower vehicle or as a cut-in by a faster vehicle, in order to reduce the number of classifications of cut-ins or to provide some other benefit.

An enumerated set of cut-in classes could include aborted cut-ins, wherein a cut-in agent leaves a starting lane and enters the subject lane of a subject vehicle before returning to and/or passing back through the starting lane. This is depicted in FIG. 6B, wherein a cut-in agent 610*b* is about to enter the subject lane in front of a subject vehicle 600*b* from a starting lane other than the subject lane before returning to the starting lane (the trajectory of the cut-in agent 610*b* is depicted by the arrow). Such aborted cut-ins could be distinguished from nominal cut-ins in that the cut-in agent for an aborted cut-in returns to and/or passes back through the starting lane within a specified period of time after the cut-in agent cut into the subject lane.

An enumerated set of cut-in classes could include cut-throughs, wherein a cut-in agent leaves a starting lane and enters the subject lane of a subject vehicle before exiting the subject lane in the direction opposite the starting lane. This is depicted in FIG. 6C, wherein a cut-in agent 610*c* is about to enter the subject lane in front of a subject vehicle 600*c* from a starting lane other than the subject lane before exiting the subject lane into a lane on the opposite side of the starting lane with respect to the subject lane (the trajectory of the cut-in agent 610*c* is depicted by the arrow). Such cut-throughs could be distinguished from nominal cut-ins by the cut-in agent exiting into and/or passing through the opposite lane within a specified period of time after the cut-in agent cut into the subject lane.

An enumerated set of cut-in classes could include zipper cut-ins, wherein two (or more) cut-in agents leave respective starting lanes that are opposite the subject lane of a subject vehicle to enter the subject lane. This is depicted in FIG. 6D, wherein a first cut-in agent 610*d* is about to enter the subject lane in front of a subject vehicle 600*d* from a first starting lane other than the subject lane and a second cut-in agent 615*d* is about to enter the subject lane in front of the subject vehicle 600*d* from a second starting lane that is other than the subject lane and that is opposite the subject lane from the first lane (the trajectories of the cut-ins agents 610*d*, 615*d* are depicted by the arrows). Such zipper cut-ins could be distinguished from nominal cut-ins by the respective detected discrete cut-ins of the first and second cut-in agents overlapping in time, beginning and/or ending within a specified period of time of each other, or being related in space and/or time in some other manner.

Once a set of cut-ins have been identified within a set of training data, the identified set of cut-ins can be used to update, select, combine, assess, generate, and/or improve one or more models used to control an autonomous or semi-autonomous vehicle. This could include extracting, from a set of training data, cut-in data that depicts the identified cut-ins within the training data. This could include extracting segments of the training data that correspond in time to the identified cut-ins and using such extracted segments of training data and/or variables determined therefrom to assess and/or train one or more models. For example, a segment of the training data spanning from a specified period before the occurrence of a cut-in to a specified period of time after a determined end of the cut-in could be extracted from a set of training data and used to assess and/or train a model. Determined classifications of the identified cut-ins (e.g., nominal, cut-through, etc.) could also be used to assess and/or train the models. For example, the classifications could be provided as an input to the models (e.g., where another sub-model is trained to predict cut-in type). Additionally or alternatively, determined classifications of the cut-ins could be used to balance the set of extracted segments of training data across the different classes of cut-ins and/or to direct the generation of simulated training data.

Assessing and/or training models for controlling an autonomous or semi-autonomous vehicle can include determining, based on the identified cut-ins, a score for the model(s) that were controlling a subject vehicle during the identified cut-ins based on the model's reaction to the identified cut-ins. Such a score could be determined for each identified cut-in, or for a set of identified cut-ins. For example, a score could be determined for a particular model or version of a model based on all of the identified cut-ins where the particular model or model version was controlling a subject vehicle. In another example, a score could be determined for a particular cut-in class based on all of the identified cut-ins of that particular cut-in class.

Such a score could be determined based on a variety of information from a training data set and/or from information determined therefrom about an autonomous or semi-autonomous vehicle's reaction to each identified cut-in. For example, a score for a particular cut-in could be determined based on one or more of a degree to which the vehicle slowed down due to the particular cut-in, a degree to which the vehicle applied brakes due to the particular cut-in, a timing of an action taken by the vehicle in reaction to the particular cut-in relative to a timing at which the particular cut-in occurred, a minimum distance between the vehicle and a cut-in agent following the particular cut-in, and/or a duration of a period that the vehicle followed a cut-in agent at a distance less than a threshold safety distance following the particular cut-in.

Such determined scores could be used to generate human-interpretable metrics for the quality of one or more models for controlling an autonomous or semi-autonomous vehicle with respect to safety, efficiency, vehicle wear, or other factors. Additionally or alternatively, such scores could be used to select, combine, update, train, improve, and/or generate models for controlling an autonomous or semi-autonomous vehicle.

Additionally or alternatively, such scores could be used as part of a process for training, improving, and/or generating such models for controlling an autonomous or semi-autonomous vehicle. For example, such scores could be used as feedback for reinforcement learning to generate updates of a model. In another example, such scores could be used to select whether to retain, replicate, fold, discard, combine with another model, set a relative weight as part of a combination, or take some other action with respect to each model of a set of models that were used to control autonomous or semi-autonomous vehicles in a set of training data as part of a genetic algorithm or some other training method that can be informed by such scores.

FIG. 7 is a flowchart diagram of a method 700, according to example embodiments. In some embodiments, one or more of the blocks of FIG. 7 may be performed by a computing device (e.g., a controller of an autonomous or semi-autonomous vehicle). The computing device may include computing components such as a non-volatile memory (e.g., a hard drive or a read-only memory (ROM)), a volatile memory (e.g., a random-access memory (RAM), such as dynamic random-access memory (DRAM) or static random-access memory (SRAM)), a user-input device (e.g., a mouse or a keyboard), a display (e.g., an LED display or an LCD), and/or a network communication controller (e.g., a WIFI® controller, based on IEEE 802.11 standards, or an Ethernet controller). The computing device, for example, may execute instructions stored on a non-transitory, computer-readable medium (e.g., a hard drive) to perform one or more of the operations contemplated herein.

At block 702, the method 700 may include obtaining operational data about one or more vehicles, wherein the operational data about a given vehicle of the one or more vehicles comprises information about the size and location over time of one or more additional vehicles in the environment of the given vehicle, information about the location and trajectory of the given vehicle over time, and information about the extent of a lane being navigated by the given vehicle over time. The operational data could include additional information relevant to the operation of an autonomous vehicle and/or to its environment, e.g., information about road geometry (e.g. presence of a merge/onramp/off-ramp, lane closures, construction zones, etc.), environmental factors (e.g. weather), and/or other information.

At block 704, the method 700 may include, based on the operational data, identifying the presence of one or more cut-ins within the operational data. Identifying the presence of a given cut-in includes: (i) determining the location and extent over time of a bounding box surrounding a particular additional vehicle in the environment of the given vehicle, (ii) determining that at least one vertex of the bounding box was located more than a threshold distance within the lane being navigated by the given vehicle, and (iii) determining that the ability of the given vehicle to maintain its course and speed was impeded by the presence of the particular additional vehicle within the lane being navigated by the given vehicle when the at least one vertex of the bounding box was located more than a threshold distance within the lane being navigated by the given vehicle.

At block 706, the method 700 may include extracting, from the operational data, cut-in data that depicts one or more of the cut-ins identified within the operational data.

At block 708, the method 700 may include, based on the extracted cut-in data, training a model for controlling an autonomous vehicle.

The method 700 may include additional or alternative steps or features.

FIG. 8 is a flowchart diagram of a method 800, according to example embodiments. In some embodiments, one or more of the blocks of FIG. 8 may be performed by a computing device (e.g., a controller of an autonomous or semi-autonomous vehicle). The computing device may include computing components such as a non-volatile memory (e.g., a hard drive or a read-only memory (ROM)), a volatile memory (e.g., a random-access memory (RAM), such as dynamic random-access memory (DRAM) or static random-access memory (SRAM)), a user-input device (e.g., a mouse or a keyboard), a display (e.g., an LED display or an LCD), and/or a network communication controller (e.g., a WIFI® controller, based on IEEE 802.11 standards, or an Ethernet controller). The computing device, for example, may execute instructions stored on a non-transitory, computer-readable medium (e.g., a hard drive) to perform one or more of the operations contemplated herein.

At block 802, the method 800 may include obtaining operational data for a vehicle under autonomous or semi-autonomous control, wherein the operational data comprises information about the size and location over time of one or more additional vehicles in the environment of the vehicle and information about the extent of a lane being navigated by the vehicle over time. The operational data could include additional information relevant to the operation of a vehicle and/or to its environment, e.g., information about road geometry (e.g. presence of a merge/onramp/off-ramp, lane closures, construction zones, etc.), environmental factors (e.g. weather), and/or other information.

At block 804, the method 800 may include applying the operational data to a trained model to generate a control output. The trained model has been trained by: (a) obtaining operational data about one or more vehicles, wherein the operational data about a given vehicle of the one or more vehicles includes information about the size and location over time of one or more additional vehicles in the environment of the given vehicle, information about the location and trajectory of the given vehicle over time, and information about the extent of a lane being navigated by the given vehicle over time; (b) based on the operational data, identifying the presence of one or more cut-ins within the operational data, wherein identifying the presence of a given cut-in comprises: (1) determining the location and extent over time of a bounding box surrounding a particular additional vehicle in the environment of the given vehicle, (2) determining that the particular additional vehicle entered the lane being navigated by the given vehicle by at least one of determining that at least one vertex of the bounding box was located more than a threshold distance within the lane being navigated by the given vehicle or determining that the bounding box overlapped with the lane being navigated by the given vehicle by more than a threshold amount, and (3) determining that the ability of the given vehicle to maintain its course and speed was impeded by the particular additional vehicle entering the lane being navigated by the given vehicle; (c) extracting, from the operational data, cut-in data that depicts one or more of the cut-ins identified within the operational data; and (d) based on the extracted cut-in data, training the trained model to control an autonomous or semi-autonomous vehicle.

At block 806, the method 800 may include implementing the generated control output to operate the vehicle under autonomous or semi-autonomous control.

The method 800 may include additional or alternative steps or features.

FIG. 9 is a flowchart diagram of a method 900, according to example embodiments. In some embodiments, one or more of the blocks of FIG. 9 may be performed by a computing device (e.g., a controller of an autonomous or semi-autonomous vehicle). The computing device may include computing components such as a non-volatile memory (e.g., a hard drive or a read-only memory (ROM)), a volatile memory (e.g., a random-access memory (RAM), such as dynamic random-access memory (DRAM) or static random-access memory (SRAM)), a user-input device (e.g., a mouse or a keyboard), a display (e.g., an LED display or an LCD), and/or a network communication controller (e.g., a WIFI® controller, based on IEEE 802.11 standards, or an Ethernet controller). The computing device, for example, may execute instructions stored on a non-transitory, computer-readable medium (e.g., a hard drive) to perform one or more of the operations contemplated herein.

At block 902, the method 900 may include obtaining operational data for a given vehicle, wherein the operational comprises information about the size and location over time of one or more additional vehicles in the environment of the given vehicle and information about the extent of a lane being navigated by the given vehicle over time.

At block 904, the method 900 may include, based on the operational data, detecting that a cut-in is occurring. Detecting that a cut-in is occurring can include: (a) determining the location and extent over time of a bounding box surrounding a particular additional vehicle in the environment of the given vehicle, and (b) determining that the particular additional vehicle entered the lane being navigated by the given vehicle by at least one of determining that at least one vertex of the bounding box was located more than a threshold distance within the lane being navigated by the given vehicle or determining that the bounding box overlapped with the lane being navigated by the given vehicle by more than a threshold amount.

The method 900 may include additional or alternative steps or features.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including random-access memory (RAM), a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   obtaining operational data about one or more vehicles, wherein the operational data about a given vehicle of the one or more vehicles comprises information about sizes and locations over time of one or more additional vehicles in an environment of the given vehicle, information about a location and a trajectory of the given vehicle over time, and information about an extent of a lane being navigated by the given vehicle over time;

based on the operational data, identifying the presence of one or more cut-ins within the operational data, wherein identifying the presence of a given cut-in comprises: (i) determining a location and an extent over time of a bounding box surrounding a particular additional vehicle in the environment of the given vehicle, (ii) determining that the particular additional vehicle entered the lane being navigated by the given vehicle by at least one of determining that at least one vertex of the bounding box was located more than a threshold distance within the lane being navigated by the given vehicle or determining that the bounding box overlapped with the lane being navigated by the given vehicle by more than a threshold amount, and (iii) determining that the ability of the given vehicle to maintain its course and speed was impeded by the particular additional vehicle entering the lane being navigated by the given vehicle;

extracting, from the operational data, cut-in data that depicts one or more of the cut-ins identified within the operational data; and based on the extracted cut-in data, training a model for controlling an autonomous vehicle, wherein training the model for controlling the autonomous vehicle based on the extracted cut-in data comprises:

determining one or more scores for the autonomous vehicle's reaction to one or more of the cut-ins identified within the operational data, wherein the autonomous vehicle's reaction to one or more of the cut-ins identified within the operational data is determined by a first model for controlling the autonomous vehicle; and based on the one or more scores, updating the first model.

2. The method of claim 1, further comprising, based on the extracted cut-in data, classifying one or more of the cut-ins identified within the operational data.

3. The method of claim 2, wherein classifying one or more of the cut-ins identified within the operational data comprises classifying one or more of the cut-ins identified within the operational data as at least one of an aborted cut-in, a cut-through, or a zipper cut-in.

4. The method of claim 2, wherein classifying one or more of the cut-ins identified within the operational data comprises classifying one or more of the cut-ins identified within the operational data based on at least one of: a degree to which a vehicle slowed down due to the cut-in, a timing of an action taken by a vehicle in reaction to the cut-in relative to a timing at which the cut-in occurred, or a duration of a period that a vehicle followed a cut-in agent at a distance less than a threshold safety distance following a cut-in.

5. The method of claim 1, wherein the one or more scores comprise human-interpretable metrics for the quality of the first model with respect to efficiency or vehicle wear, wherein the first model is one of a plurality of such models, and wherein updating the first model comprises using the one or more scores to select whether to retain the first model, replicate the first model, fold the first model, discard the first model, combine the first model with another model in the plurality of models, or set a weight of the first model relative to other models in the plurality of models.

6. The method of claim 1, wherein determining the one or more scores comprises generating a score based on at least one of: a degree to which the autonomous vehicle slowed down due to the particular cut-in, a timing of an action taken by the autonomous vehicle in reaction to the particular cut-in relative to a timing at which the particular cut-in occurred, or a duration of a period that the autonomous vehicle followed a cut-in agent at a distance less than a threshold safety distance following the particular cut-in.

7. The method of claim 1, wherein training the model for controlling the autonomous vehicle based on the extracted cut-in data comprises, based on the one or more determined scores, selecting the first model from a plurality of such models.

8. A non-transitory computer readable medium storing instructions that, when executed by one or more processors of a computing device, cause the computing device to perform operations comprising:

obtaining operational data about one or more vehicles, wherein the operational data about a given vehicle of the one or more vehicles comprises information about sizes and locations over time of one or more additional vehicles in an environment of the given vehicle, information about a location and a trajectory of the given vehicle over time, and information about an extent of a lane being navigated by the given vehicle over time;

based on the operational data, identifying the presence of one or more cut-ins within the operational data, wherein identifying the presence of a given cut-in comprises: (i) determining a location and an extent over time of a bounding box surrounding a particular additional vehicle in the environment of the given vehicle, (ii) determining that the particular additional vehicle entered the lane being navigated by the given vehicle by at least one of determining that at least one vertex of the bounding box was located more than a threshold distance within the lane being navigated by the given vehicle or determining that the bounding box overlapped with the lane being navigated by the given vehicle by more than a threshold amount, and (iii) determining that the ability of the given vehicle to maintain its course and speed was impeded by the particular additional vehicle entering the lane being navigated by the given vehicle;

extracting, from the operational data, cut-in data that depicts one or more of the cut-ins identified within the operational data; and based on the extracted cut-in data, training a model for controlling an autonomous vehicle, wherein training the model for controlling the autonomous vehicle based on the extracted cut-in data comprises:

determining one or more scores for the autonomous vehicle's reaction to one or more of the cut-ins identified within the operational data, wherein the autonomous vehicle's reaction to one or more of the cut-ins identified within the operational data is determined by a first model for controlling the autonomous vehicle; and based on the one or more scores, updating the first model.

9. The non-transitory computer readable medium of claim 8, wherein the operations further comprise, based on the extracted cut-in data, classifying one or more of the cut-ins identified within the operational data.

10. The non-transitory computer readable medium of claim 9, wherein classifying one or more of the cut-ins identified within the operational data comprises classifying one or more of the cut-ins identified within the operational data as at least one of a an aborted cut-in, a cut-through, or a zipper cut-in.

11. The non-transitory computer readable medium of claim 9, wherein classifying one or more of the cut-ins identified within the operational data comprises classifying one or more of the cut-ins identified within the operational data based on at least one of: a degree to which a vehicle slowed down due to the cut-in, a timing of an action taken by a vehicle in reaction to the cut-in relative to a timing at which the cut-in occurred, or a duration of a period that a vehicle followed a cut-in agent at a distance less than a threshold safety distance following a cut-in.

12. The non-transitory computer readable medium of claim 8, wherein the one or more scores comprise human-interpretable metrics for the quality of the first model with respect to efficiency or vehicle wear, wherein the first model is one of a plurality of such models, and wherein updating the first model comprises using the one or more scores to select whether to retain the first model, replicate the first model, fold the first model, discard the first model, combine the first model with another model in the plurality of models.

13. The non-transitory computer readable medium of claim 8, wherein determining the one or more scores comprises generating a score based on at least one of: a degree to which the autonomous vehicle slowed down due to the particular cut-in, a timing of an action taken by the autonomous vehicle in reaction to the particular cut-in relative to a timing at which the particular cut-in occurred, or a duration of a period that the autonomous vehicle followed a cut-in agent at a distance less than a threshold safety distance following the particular cut-in.

14. The non-transitory computer readable medium of claim 8, wherein training the model for controlling the autonomous vehicle based on the extracted cut-in data comprises, based on the one or more determined scores, selecting the first model from a plurality of such models.

15. A system comprising:
one or more processing units; and
a non-transitory computer-readable medium storing at least computer-executable instructions that, when executed by the one or more processing units, cause the one or more processing units to perform operations comprising:
obtaining operational data about one or more vehicles, wherein the operational data about a given vehicle of the one or more vehicles comprises information about sizes and locations over time of one or more additional vehicles in an environment of the given vehicle, information about a location and a trajectory of the given vehicle over time, and information about an extent of a lane being navigated by the given vehicle over time;
based on the operational data, identifying the presence of one or more cut-ins within the operational data, wherein identifying the presence of a given cut-in comprises: (i) determining a location and an extent over time of a bounding box surrounding a particular additional vehicle in the environment of the given vehicle, (ii) determining that the particular additional vehicle entered the lane being navigated by the given vehicle by at least one of determining that at least one vertex of the bounding box was located more than a threshold distance within the lane being navigated by the given vehicle or determining that the bounding box overlapped with the lane being navigated by the given vehicle by more than a threshold amount, and (iii) determining that the ability of the given vehicle to maintain its course and speed was impeded by the particular additional vehicle entering the lane being navigated by the given vehicle;
extracting, from the operational data, cut-in data that depicts one or more of the cut-ins identified within the operational data; and
based on the extracted cut-in data, training a model for controlling an autonomous vehicle, wherein training the model for controlling the autonomous vehicle based on the extracted cut-in data comprises:
determining one or more scores for the autonomous vehicle's reaction to one or more of the cut-ins identified within the operational data, wherein the autonomous vehicle's reaction to one or more of the cut-ins identified within the operational data is determined by a first model for controlling the autonomous vehicle; and
based on the one or more scores, updating the first model.

16. The system of claim 15, wherein the operations further comprise, based on the extracted cut-in data, classifying one or more of the cut-ins identified within the operational data.

17. The system of claim 16, wherein classifying one or more of the cut-ins identified within the operational data comprises classifying one or more of the cut-ins identified within the operational data as at least one of an aborted cut-in, a cut-through, or a zipper cut-in.

18. The system of claim 16, wherein classifying one or more of the cut-ins identified within the operational data comprises classifying one or more of the cut-ins identified within the operational data based on at least one of: a degree to which a vehicle slowed down due to the cut-in, a timing of an action taken by a vehicle in reaction to the cut-in relative to a timing at which the cut-in occurred, or a duration of a period that a vehicle followed a cut-in agent at a distance less than a threshold safety distance following a cut-in.

19. The system of claim 15, wherein the one or more scores comprise human-interpretable metrics for the quality of the first model with respect to efficiency or vehicle wear, wherein the first model is one of a plurality of such models, and wherein updating the first model comprises using the one or more scores to select whether to retain the first model, replicate the first model, fold the first model, discard the first model, combine the first model with another model in the plurality of models, or set a weight of the first model relative to other models in the plurality of models.

20. The system of claim 15, wherein determining the one or more scores comprises generating a score based on at least one of: a degree to which the autonomous vehicle slowed down due to the particular cut-in, a timing of an action taken by the autonomous vehicle in reaction to the particular cut-in relative to a timing at which the particular cut-in occurred, or a duration of a period that the autonomous vehicle followed a cut-in agent at a distance less than a threshold safety distance following the particular cut-in.

* * * * *